US009881396B2

(12) United States Patent
Ruble et al.

(10) Patent No.: US 9,881,396 B2
(45) Date of Patent: Jan. 30, 2018

(54) DISPLAYING TEMPORAL INFORMATION IN A SPREADSHEET APPLICATION

(71) Applicant: Microsoft Technology Licensing, LLC, Redmond, WA (US)

(72) Inventors: B. Scott Ruble, Bellevue, WA (US); Curtis G. Wong, Medina, WA (US); Igor Borisov Peev, Arlington, WA (US); Kevin Fan, Seattle, WA (US); Jai Srinivasan, Bellevue, WA (US); Ehab Sobhy, Redmond, WA (US); Jonathan Edgar Fay, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 518 days.

(21) Appl. No.: 13/856,116

(22) Filed: Apr. 3, 2013

(65) Prior Publication Data
US 2014/0047312 A1    Feb. 13, 2014

Related U.S. Application Data

(60) Provisional application No. 61/681,851, filed on Aug. 10, 2012.

(51) Int. Cl.
*G06F 17/00* (2006.01)
*G06T 11/20* (2006.01)
(Continued)

(52) U.S. Cl.
CPC ............. *G06T 11/206* (2013.01); *G06F 3/01* (2013.01); *G06F 3/048* (2013.01); *G06F 3/0481* (2013.01);
(Continued)

(58) Field of Classification Search
CPC .................................................... G06F 17/246
(Continued)

(56) References Cited

U.S. PATENT DOCUMENTS 4,041,467 A    8/1977   Cota et al.
5,526,478 A    6/1996   Russell, Jr. et al.
(Continued)

FOREIGN PATENT DOCUMENTS

CN    1808376      7/2006
CN    101014831    8/2007
(Continued)

OTHER PUBLICATIONS

U.S. Official Action dated Jun. 6, 2014 in U.S. Appl. No. 13/711,629.
(Continued)

*Primary Examiner* — Stephen Hong
*Assistant Examiner* — Matthew Ludwig
(74) *Attorney, Agent, or Firm* — Schwegman Lundberg & Woessner, P.A.

(57) ABSTRACT

Concepts and technologies are described herein for displaying temporal information in a spreadsheet application. In accordance with the concepts and technologies disclosed herein, spreadsheet data can be obtained at a computer system. The spreadsheet data can include data values, temporal information, and geographic information. The computer system can generate a visualization of the spreadsheet data based, at least partially, upon the data values, the temporal information, and the geographic location information. The computer system also can output the visualization.

19 Claims, 12 Drawing Sheets

(51) Int. Cl.

| | | |
|---|---|---|
| *G06F 3/0484* | (2013.01) | |
| *G06F 3/0482* | (2013.01) | |
| *G06T 15/10* | (2011.01) | |
| *G06T 13/00* | (2011.01) | |
| *G06F 17/30* | (2006.01) | |
| *G06F 17/24* | (2006.01) | |
| *G06F 3/0481* | (2013.01) | |
| *G06F 3/01* | (2006.01) | |
| *G06F 3/0488* | (2013.01) | |
| *G06T 19/00* | (2011.01) | |
| *G06F 3/048* | (2013.01) | |
| *G06T 15/00* | (2011.01) | |

(52) U.S. Cl.
CPC .......... *G06F 3/0482* (2013.01); *G06F 3/0488* (2013.01); *G06F 3/04815* (2013.01); *G06F 3/04842* (2013.01); *G06F 3/04847* (2013.01); *G06F 17/24* (2013.01); *G06F 17/241* (2013.01); *G06F 17/246* (2013.01); *G06F 17/30056* (2013.01); *G06F 17/30061* (2013.01); *G06F 17/3087* (2013.01); *G06F 17/30241* (2013.01); *G06F 17/30244* (2013.01); *G06F 17/30551* (2013.01); *G06F 17/30554* (2013.01); *G06F 17/30572* (2013.01); *G06F 17/30991* (2013.01); *G06T 13/00* (2013.01); *G06T 15/00* (2013.01); *G06T 15/10* (2013.01); *G06T 19/00* (2013.01)

(58) Field of Classification Search
USPC ........................................ 715/201, 212, 215
See application file for complete search history.

(56) References Cited

U.S. PATENT DOCUMENTS

| | | | |
|---|---|---|---|
| 5,960,437 A | 9/1999 | Krawchuk et al. | |
| 5,977,978 A | 11/1999 | Carey et al. | |
| 6,256,649 B1 | 7/2001 | Mackinlay et al. | |
| 6,256,651 B1 | 7/2001 | Tuli | |
| 6,360,332 B1 | 3/2002 | Weinberg et al. | |
| 6,501,469 B1 | 12/2002 | Macphail | |
| 6,587,969 B1 | 7/2003 | Weinberg et al. | |
| 6,707,454 B1 | 3/2004 | Barg et al. | |
| 6,904,392 B1 | 6/2005 | Marty et al. | |
| 6,990,637 B2 | 1/2006 | Anthony et al. | |
| 6,995,768 B2 | 2/2006 | Jou et al. | |
| 7,010,616 B2 | 3/2006 | Carlson et al. | |
| 7,039,240 B2 | 5/2006 | Greene et al. | |
| 7,039,899 B1 | 5/2006 | Quiroga | |
| 7,057,612 B2 | 6/2006 | Balfour | |
| 7,093,240 B1 | 8/2006 | Rodi et al. | |
| 7,127,672 B1 | 10/2006 | Patterson et al. | |
| 7,225,189 B1 | 5/2007 | McCormack et al. | |
| 7,264,554 B2 | 9/2007 | Bentley | |
| 7,289,227 B2 | 10/2007 | Smetak et al. | |
| 7,333,113 B2 | 2/2008 | Gordon | |
| 7,358,972 B2 | 4/2008 | Gordon et al. | |
| 7,370,883 B2 | 5/2008 | Basir et al. | |
| 7,415,481 B2 | 8/2008 | Becker et al. | |
| 7,474,256 B2 | 1/2009 | Ohta et al. | |
| 7,475,344 B1 | 1/2009 | Patil | |
| 7,571,151 B1 | 8/2009 | Fontaine | |
| 7,573,480 B2 | 8/2009 | Gordon | |
| 7,688,998 B2 | 3/2010 | Tuma et al. | |
| 7,696,876 B2 | 4/2010 | Dimmer et al. | |
| 7,737,979 B2 | 6/2010 | Robertson et al. | |
| 7,746,343 B1 | 6/2010 | Charaniya et al. | |
| 7,810,021 B2 | 10/2010 | Paxson | |
| 7,812,842 B2 | 10/2010 | Gordon | |
| 7,840,031 B2 | 11/2010 | Albertson et al. | |
| 7,857,212 B1 | 12/2010 | Matthews | |
| 7,869,938 B2 | 1/2011 | Wako | |
| 7,870,496 B1 | 1/2011 | Sherwani | |
| 7,925,982 B2 | 4/2011 | Parker et al. | |
| 8,015,183 B2 | 9/2011 | Frank | |
| 8,024,656 B2 | 9/2011 | Behnen et al. | |
| 8,095,434 B1 | 1/2012 | Puttick et al. | |
| 8,224,304 B2 | 7/2012 | Gatti et al. | |
| 8,319,772 B2 | 11/2012 | Fong et al. | |
| 8,368,722 B1 | 2/2013 | Moore | |
| 8,397,177 B2 | 3/2013 | Barros | |
| 8,584,013 B1 | 11/2013 | Tveit | |
| 8,601,402 B1 | 12/2013 | Habboub | |
| 8,793,575 B1 | 7/2014 | Lattyak et al. | |
| 8,812,947 B1 | 8/2014 | Maoz et al. | |
| 8,884,964 B2 | 11/2014 | Holl et al. | |
| 8,892,123 B2 | 11/2014 | Krantz et al. | |
| 8,924,843 B1* | 12/2014 | Hao et al. ..................... 715/220 |
| 8,947,435 B2 | 2/2015 | Kim et al. | |
| 8,966,356 B1 | 2/2015 | Hickman et al. | |
| 8,984,415 B2* | 3/2015 | Rose et al. ..................... 715/744 |
| 9,007,302 B1 | 4/2015 | Bandt-Horn | |
| 9,015,591 B2* | 4/2015 | Khosravy et al. ............ 715/732 |
| 9,141,641 B2 | 9/2015 | Gaertner et al. | |
| 9,317,963 B2 | 4/2016 | Ruble et al. | |
| 9,383,911 B2 | 7/2016 | Aymeloglu et al. | |
| 9,454,281 B2 | 9/2016 | Ward et al. | |
| 9,454,785 B1 | 9/2016 | Hunter et al. | |
| 2002/0161799 A1 | 10/2002 | Maguire, III et al. | |
| 2003/0028848 A1 | 2/2003 | Choi | |
| 2003/0071814 A1 | 4/2003 | Jou et al. | |
| 2004/0126803 A1 | 7/2004 | Cash et al. | |
| 2004/0152056 A1 | 8/2004 | Lamb et al. | |
| 2004/0216033 A1 | 10/2004 | Hallett et al. | |
| 2006/0013487 A1 | 1/2006 | Longe et al. | |
| 2006/0095447 A1 | 5/2006 | Dickinson et al. | |
| 2006/0112123 A1 | 5/2006 | Clark et al. | |
| 2007/0101252 A1 | 5/2007 | Chamberlain et al. | |
| 2007/0132767 A1 | 6/2007 | Wright et al. | |
| 2007/0150553 A1 | 6/2007 | Fields et al. | |
| 2007/0245238 A1 | 10/2007 | Fugitt et al. | |
| 2008/0033641 A1 | 2/2008 | Medalia | |
| 2008/0077597 A1 | 3/2008 | Butler | |
| 2008/0163328 A1 | 7/2008 | Philbin et al. | |
| 2008/0189639 A1 | 8/2008 | Iyer et al. | |
| 2008/0192056 A1 | 8/2008 | Robertson et al. | |
| 2008/0215959 A1 | 9/2008 | Lection | |
| 2008/0270366 A1 | 10/2008 | Frank | |
| 2008/0288889 A1 | 11/2008 | Hunt et al. | |
| 2008/0291206 A1 | 11/2008 | Uchimura et al. | |
| 2008/0294662 A1 | 11/2008 | Chen | |
| 2008/0295038 A1 | 11/2008 | Helfman et al. | |
| 2008/0301112 A1 | 12/2008 | Wu | |
| 2009/0040186 A1 | 2/2009 | Esenther | |
| 2009/0041329 A1 | 2/2009 | Nordell et al. | |
| 2009/0044121 A1 | 2/2009 | Berger et al. | |
| 2009/0096812 A1 | 4/2009 | Boixel | |
| 2009/0128565 A1 | 5/2009 | Wong et al. | |
| 2009/0132952 A1 | 5/2009 | Wong | |
| 2009/0132967 A1 | 5/2009 | Wong et al. | |
| 2009/0153585 A1 | 6/2009 | Mahajan et al. | |
| 2009/0182755 A1 | 7/2009 | Adair et al. | |
| 2009/0217187 A1 | 8/2009 | Kendall et al. | |
| 2009/0229819 A1 | 9/2009 | Repin et al. | |
| 2009/0234864 A1 | 9/2009 | Ellis et al. | |
| 2009/0276692 A1 | 11/2009 | Rosner | |
| 2009/0307607 A1 | 12/2009 | Schauls et al. | |
| 2009/0307618 A1 | 12/2009 | Kawler et al. | |
| 2009/0319553 A1 | 12/2009 | Le Brazidec et al. | |
| 2010/0054527 A1 | 3/2010 | Kirmse et al. | |
| 2010/0083184 A1 | 4/2010 | Trent et al. | |
| 2010/0088619 A1 | 4/2010 | Rath et al. | |
| 2010/0117622 A1 | 5/2010 | Miller et al. | |
| 2010/0134484 A1 | 6/2010 | Chen et al. | |
| 2010/0156889 A1 | 6/2010 | Martinez et al. | |
| 2010/0167256 A1 | 7/2010 | Blash | |
| 2010/0185933 A1 | 7/2010 | Coffman et al. | |
| 2010/0185984 A1 | 7/2010 | Wright et al. | |
| 2010/0194778 A1* | 8/2010 | Robertson ............... G06T 13/00 345/619 |
| 2010/0238182 A1 | 9/2010 | Geisner et al. | |

(56) References Cited

U.S. PATENT DOCUMENTS

| | | | |
|---|---|---|---|
| 2010/0271391 | A1 | 10/2010 | Repin et al. |
| 2010/0306128 | A1 | 12/2010 | Moffat |
| 2010/0318512 | A1 | 12/2010 | Ludwig |
| 2010/0325196 | A1 | 12/2010 | Beckman et al. |
| 2011/0066933 | A1 | 3/2011 | Ludwig |
| 2011/0102424 | A1 | 5/2011 | Hibbert et al. |
| 2011/0137766 | A1 | 6/2011 | Rasmussen et al. |
| 2011/0140928 | A1 | 6/2011 | Ren et al. |
| 2011/0166831 | A1 | 7/2011 | Snyder et al. |
| 2011/0173193 | A1 | 7/2011 | Ahn et al. |
| 2011/0210983 | A1 | 9/2011 | Theimer et al. |
| 2011/0270705 | A1 | 11/2011 | Parker |
| 2011/0285727 | A1 | 11/2011 | Fernandez et al. |
| 2012/0042282 | A1 | 2/2012 | Wong |
| 2012/0084733 | A1 | 4/2012 | Guo et al. |
| 2012/0110513 | A1 | 5/2012 | Gaertner et al. |
| 2012/0117112 | A1 | 5/2012 | Johnston et al. |
| 2012/0137204 | A1 | 5/2012 | Petrovicky et al. |
| 2012/0144325 | A1 | 6/2012 | Mital et al. |
| 2012/0173501 | A1 | 7/2012 | Ganesan et al. |
| 2012/0173985 | A1 | 7/2012 | Peppel |
| 2012/0191786 | A1 | 7/2012 | Downing |
| 2012/0192051 | A1 | 7/2012 | Rothschiller et al. |
| 2012/0218254 | A1 | 8/2012 | Abeln |
| 2012/0236201 | A1 | 9/2012 | Larsen et al. |
| 2012/0284670 | A1 | 11/2012 | Kashik et al. |
| 2013/0139044 | A1 | 5/2013 | Iversen |
| 2013/0179817 | A1 | 7/2013 | Bak et al. |
| 2014/0006966 | A1 | 1/2014 | Geralci |
| 2014/0007017 | A1 | 1/2014 | Sternfeld et al. |
| 2014/0026088 | A1 | 1/2014 | Monte |
| 2014/0028674 | A1 | 1/2014 | Eldin |
| 2014/0043325 | A1 | 2/2014 | Ruble et al. |
| 2014/0043340 | A1 | 2/2014 | Sobhy et al. |
| 2014/0046923 | A1 | 2/2014 | Ruble et al. |
| 2014/0047313 | A1 | 2/2014 | Patterson et al. |
| 2014/0047328 | A1 | 2/2014 | Ruble et al. |
| 2014/0047381 | A1 | 2/2014 | Fan et al. |
| 2014/0047385 | A1 | 2/2014 | Ruble et al. |
| 2014/0182350 | A1 | 7/2014 | Bhavaraju et al. |
| 2014/0380244 | A1 | 12/2014 | Tecarro et al. |
| 2015/0169694 | A1 | 6/2015 | Longo et al. |
| 2015/0172396 | A1 | 6/2015 | Longo et al. |
| 2015/0346992 | A1 | 12/2015 | Fan et al. |
| 2016/0196674 | A1 | 7/2016 | Ruble et al. |

FOREIGN PATENT DOCUMENTS

| | | |
|---|---|---|
| CN | 101166327 | 4/2008 |
| CN | 101187868 | 5/2008 |
| CN | 101390042 | 3/2009 |
| CN | 101401098 | 4/2009 |
| CN | 101877015 | 11/2010 |
| CN | 101918983 | 12/2010 |
| CN | 102474540 | 5/2012 |
| CN | 102609507 | 7/2012 |
| CN | 102629271 | 8/2012 |
| EP | 1736903 | 12/2006 |
| EP | 1840515 | 10/2007 |
| TW | 200847041 | 12/2008 |
| WO | WO 2010/087782 A2 | 8/2010 |

OTHER PUBLICATIONS

U.S. Official Action dated Dec. 16, 2014 in U.S. Appl. No. 13/856,476.
U.S. Official Action dated Nov. 6, 2014 in U.S. Appl. No. 13/760,032.
"Create a Map / BatchGeo" Published 2010, Available at http://www/batchgeo.com, 7pp.
Pidgorny, Slawa, "3D Graphics Animations in Excel," Published on: Feb. 23, 2011 [online][retrieved on Apr. 9, 2015] retrieved from: http://spidgorny.blogspot.com/2011/02/3d-graphics-animations-in-excel.html, 3 pages.
International Search Report dated Nov. 28, 2013 in International Application No. PCT/US13/054038.
International Search Report dated Oct. 24, 2013 in International Application No. PCT/US13/ 054039.
International Search Report dated Nov. 28, 2013 in International Application No. PCT/US13/054235.
International Search Report dated Oct. 14, 2013 in International Application No. PCT/US13/054236.
International Search Report dated Oct. 24, 2013 in International Application No. PCT/US13/054237.
International Search Report dated Nov. 7, 2013 in International Application No. PCT/US13/054238.
International Search Report dated Oct. 15, 2013 in International Application No. PCT/US13/054234.
International Search Report dated Oct. 18, 2013 in International Application No. PCT/US13/054239.
Aliakseyeu et al., "Interaction Techniques for Navigation through and Manipulation of 2D and 3D Data," Published on: May 30, 2002, In *Eigth Eurographics Workshop on Virtual Environments*, 10pp.
Allegra, Christo, "3D Data Visualization / Casey Reas", Winter 2009, Available at: http://plastid.com/files/3Dvisualization.pdf, 6pp.
Andy, "Google Earth—From the 3D City to Data Visualisation", Published on: Oct. 7, 2007, Avaible at: http://www. digitalurban.org/2007/10/google-earth-from-3d-city-to-data.html, 3pp.
Ben-Yitzhak et al., "Beyond Basic Faceted Search," Feb. 11, 2008, *Proceedings of the international conference on web search and web data mining '08*, 11 pp.
Chi, Ed Huai-Hsin, "A Framework for Information Visualization Spreadsheets", Published on: Mar. 8, 1999, Doctoral Thesis submitted to the faculty of the graduate school of the University of Minnesota, Available at: http://citeseerx.ist.psu.edu/viewdoc/download?doi=10.1.1.25.5975&rep=rep1&type=pdf, 160pp.
Chi et al., "Principles for Information Visualization Spreadsheets," Published on: Jul. 1998, In *IEEE Computer Graphics and Applications*, 9pp.
Clarke, Keir, "Viewing Large Data Sets with Google Maps," Sep. 9, 2010, Available at: webarchive.org/web/20111017065022/http://googlemapsmania.blogspot.com/2010/09/viewing-large-data-sets-with-google.html, 4 pp.
Clarkson et al., "ResultMaps: Visualization for Search Interfaces", Oct. 11, 2009, *IEEE Transactions on Visualization and Computer, Graphics*, vol. 15, No. 6, 8pp.
Heer et al., "Animated Transitions in Statistical Data Graphics," Oct. 27, 2007, *IEEE Transactions on Visualization and Computer Graphics*, 13(6):1240-1247.
Jankun-Kelly et al., "A Spreadsheet Interface for Visualization Exploration," Published on: Oct. 13, 2000, In *IEEE Visualization*, 9pp.
Javaid, "Embed Video in Excel 2010", Published on: Mar. 6, 2010, Available at: http://www.addictivetips.com/microsoft-office/embed-video-in-excel-2010/, 6pp.
Lutz et al., "Chartflight—From Spreadsheets to Computer-Animated Data Flights," 2010, *Proceedings of the 15th International Conference on Web 3D Technology*, pp. 127-136.
McDermott, Mat, "Great New Google Earth Layer Maps US Carbon Emission," Published on: Feb. 20, 2009, Available at: http://web.archive.org/web/20120206220208/http://www.treehugger.com/clean-technology/great-new-google-earth-layer-maps-us-carbon-emissions.html, 3 pp.
Pilgrim et al., "Abstract Data Visualisation in the Built Environment", Published on: Jul. 19, 2000, In *IEEE International Conference on Information Visualization*, 9pp.
Rayson, "Aggregate Towers: Scale Sensitive Visualization and Decluttering of Geospatial Data," Published on: Oct. 24, 1999, in *Information Visualization*, 9pp.
Roth et al., "Visage: A User Interface Environment for Exploring Information," Oct. 18, 1996, *IEEE Symposium on Information Visualization*, 8 pp.

(56) References Cited

OTHER PUBLICATIONS

Shiozawa et al., "3D Interactive Visualization for Inter-Cell Dependencies of Spreadsheets", Oct. 24, 1999, *IEEE Symposium on Information Visualization*, 4 pp.
Svennerberg, Gabriel, "Handling Large Amounts of Markers in Google Maps," Published on: Jan. 13, 2009, Available at: http://www.svennerberg.com/2009/01/handling-large-amounts-of-markers-in-google-maps/, 7pp.
Webb, Chris, "Self-Service BI Mapping with Microsoft Research's Layerscape—Part1," Published on: Apr. 13, 2012, Available at: http://cwebbi.wordpress.com/2012/04/13/self-servicde-bi-mapping-with-microsoft-researchs-layerscapepart-1/, 13 pp.
Woodward, "Mappable 3D Data Visualizations in Real-Time", Published on: Jan. 23, 2012, Available at: http://www.visualnews.com/2012/01l23/mappable-3d-data-visualizations-in-real-time/, 15 pp.
"3D Graphics Animations in Excel," Feb. 23, 2011, Spidgorny, YouTube Video, Available at: http://www.youtube.com/watch?feature=player_embedded&v=7ucoeXEnkHO, 1 p.
"Displaying annotation features in ArcGlobe", Published on: Dec. 7, 2012, Available at: http://resources.arcgis.com/en/help/main/10.llindex.html#//00q800000022000000, 2pp.
"Effective Information Visualization Guidelines and Metrics for 3D Interactive Representations of Business Data", Published on Dec. 7, 2012, Available at: http://www3.sympatico.ca/blevis/thesis49guide.html, 41 pp.
"Visualize Field Data in Google Earth and Fusion Tables," Published on: Apr. 29, 2012, Available at: http://web.archive.org/web/20120429055706/http://www.google.com/earth/outreach/tutorials/odk_visualize.html, 4pp.
"Welcome to the WorldWide Telescope Add-in for Excel," retrieved Dec. 13, 2012 from http://www.layerscape.org/Home/ExcelAddInWelcome, 2 pp.
Wong, Curtis, "Building the WorldWide Telescope," Jun. 2008, SIGMOND Record, 37(2): 67-69.
Wong, Curtis, "Contextual Narrative as an Information Architecture for the WorldWide Telescope," May 2008, CAPjournal, 3: 22-25.
Kanipe, Jeff "The Universe in Your Computer," Jan. 2009, Communication of the ACM, 51(1): 12-14.
Woodring et al., "Multiscale Time Activity Data Exploration via Temporal Clustering Visualization Spreadsheet," Jan./Feb. 2009, IEEE Transactions on Visualization and Computer Graphics, 15(1): 123-137.
Zhang et al., "Beyond Co-occurrence: Discovering and Visualizing Tag Relationships from Geo-spatial and Temporal Similarities," Feb. 8-12, 2012, Proceedings of the fifth ACM international conference on Web search and data mining, WSDM '12, Seattle, Washington, 10 pp.
Chung et al., "VizCept: Supporting Synchronous Collaboration for Constructing Visualizations in Intelligence Analysis," Oct. 24-29, 2010, IEEE Symposium on Visual Analytics Science and Technology, Salt Lake City, Utah, 8 pp.
Aigner et al., "Visual Methods for Analyzing Time-Oriented Data," Jan./Feb. 2008, IEEE Transactions on Visualization and Computer Graphics, 14(1): ,47-60.
Enkhsaikhan et al., "Graphical and Temporal Visualisation of Social Relationships," Jul. 3, 2008, Proceeding of Pacific Asia Conference on Information Systems, PACIS '08, Paper 243, 12 pp.
"Improving Data Visualisation for the Public Sector: Case Study: Practical Steps for Improving Visualisation," Oct. 2, 2009, retrieved from htp://www.improving-visualisation.org/case-studies/id=7, 11 pp.
Darbyshire et al., "Getting Started With Google Apps", Friends of ED, Berkeley CA, 2010, 665 pages.
Office action for U.S. Appl. No. 13/835,721, mailed on Feb. 26, 2015, Sobhy, et al, "Animation transitions and effects in a spreadsheet application", 37 pages.
Office action for U.S. Appl. No. 13/711,629, mailed on Feb. 27, 2015, Ruble et al., "Generating Queries Based upon dated points ina spreadsheet application", 43 pages.
Office action for U.S. Appl. No. 13/765,695, mailed on Apr. 24, 2015, Patterson et al., "Three-dimensional annotation facing", 12 pages.
Office action for U.S. Appl. No. 13/760,032, mailed on Apr. 24, 2015, Ruble et al., "3D Data environment disambiguation tool", 27 pages.
Office action for U.S. Appl. No. 13/906,343, mailed on May 26, 2015, Ruble et al., "Facetted Browsing", 14 pages.
Office action for U.S. Appl. No. 13/835,721, mailed on Jun. 29, 2015, "Animation transitions and effects in a spreadsheet application", 45 pages.
Office action for U.S. Appl. No. 13/760,032, mailed on Feb. 12, 2016, Ruble et al., "3D Data Environment Disambiguation Tool", 34 pages.
Office action for U.S. Appl. No. 13/906,343, mailed on Apr. 13, 2016, Ruble et al., "Facetted Browsing", 26 pages.
Office action for U.S. Appl. No. 13/711,629, mailed on Apr. 6, 2016, Ruble et al., "Generating Queries Based Upon Data Points in a Spreadsheet Application", 34 pages.
PCT International Preliminary Report on Patentability in PCT Application No. PCT/US2013/054039, mailed Feb. 19, 2015, 8 pages.
Office action for U.S. Appl. No. 13/856,476, mailed on Jun. 8, 2016, Fan et al., "3D Data Environment Navigation Tool", 18 pages.
Office action for U.S. Appl. No. 13/765,695, mailed on Jul. 21, 2016, Patterson et al., "Three-dimensional annotation facing", 18 pages.
BatchGeo, "Create Maps", Retrieved from <<https://web.archive.org/web.20110305134009/http://www.batchgeo.com/>>, Mar. 2011, 9 pages.
BatchGeo, "How to edit your map", Retreived from <<https://www.youtube.com/watch?v=jaeR8VsEPJo>>, Mar. 30, 2010, 1 page.
Office action for U.S. Appl. No. 13/898,469, mailed on Oct. 27, 2015, Ruble et al., "Generating scenes and tours in a spreadsheet application", 7 pages.
Office action for U.S. Appl. No. 13/765,695, mailed on Oct. 29, 2015, Patterson et al., "Three-dimensional annotation facing", 18 pages.
Office action for U.S. Appl. No. 13/835,721, mailed on Oct. 30, 2015, Sobhy et al., "Animation Transitions and Effects in a Spreadsheet Application", 51 pages.
Office action for U.S. Appl. No. 13/856,476 mailed on Oct. 5, 2015, Fan et al., "3D Data Environment Navigation Tool", 13 pages.
Office action for U.S. Appl. No. 13/906,343, mailed on Oct. 8, 2015, Ruble et al., "Facetted Browsing", 21 pages.
Office action for U.S. Appl. No. 13/760,032 mailed on Sep. 10, 2015, Ruble et al., "3D Data Environment Disambiguation Tool", 31 pages.
Office action for U.S. Appl. No. 13/711,629 mailed on Sep. 10, 2015, Ruble et al., "Generating Queries Based Upon Data Points in a Spreadsheet Application", 33 pages.
Office action for U.S. Appl. No. 13/856,476, dated Oct. 3, 2016, Fan et al., "3D Data Environment Navigation Tool", 17 pages.
Office action for U.S. Appl. No. 13/906,343, dated Oct. 31, 2016, Ruble et al., "Facetted Browsing", 26 pages.
Chinese Office Action dated Feb. 17, 2017 for Chinese Patent Application No. 201380042577.2, a counterpart foreign application of U.S. Appl. No. 13/760,032.
Chinese Office Action dated Feb. 23, 2017 for Chinese Patent Application No. 201380042523.6, a counterpart foreign application of U.S. Appl. No. 13/711,629.
Chinese Office Action dated Feb. 27, 2017 for Chinese Patent Application No. 201380042555.6, a counterpart foreign application of U.S. Appl. No. 13/856,476.
Chinese Office Action dated Mar. 17, 2017 for Chinese patent application No. 201380042501.X, a counterpart foreign application of U.S. Appl. No. 13/856,116.
Chinese Office Action dated Mar. 20, 2017 for Chinese patent application No. 201380042576.8, a counerpart foreign application of U.S. Appl. No. 13/898,469.
Chinese Office Action dated Mar. 8, 2017 for Chinese patent application No. 201380042588.0, a counterpart foreign application of U.S. Appl. No. 13/835,721.

(56) References Cited

OTHER PUBLICATIONS

Chinese Office Action dated Apr. 5, 2017 for Chinese Patent Application No. 201380042548.6, a counterpart foreign application of U.S. Appl. No. 13/765,695.
Office action for U.S. Appl. No. 13/765,695, dated Feb. 9, 2017, Patterson et al., "Three-dimensional annotation facing", 19 pages.
Office action for U.S. Appl. No. 13/856,476, dated Mar. 23, 2017, Fan et al., "3D Data Environment Navigation Tool", 18 pages.
"U.S. Appl. No. 13/760,032, Notice of Allowance dated Jun. 14, 2017", 9 pgs.
"U.S. Appl. No. 13/760,032, Notice of Allowance dated Jul. 6, 2016", 20 pgs.
"U.S. Appl. No. 13/760,032, Response filed Feb. 5, 2015 to Non Final Office Action dated Nov. 6, 2014", 17 pgs.
"U.S. Appl. No. 13/760,032, Response filed May 12, 2016 to Final Office Action dated Feb. 12, 2016", 17 pgs.
"U.S. Appl. No. 13/760,032, Response filed Jul. 31, 2015 to Final Office Action dated Apr. 24, 2015", 17 pgs.
"U.S. Appl. No. 13/760,032, Response filed Dec. 10, 2015 to Non Final Office Action dated Sep. 10, 2015", 17 pgs.
"U.S. Appl. No. 13/765,695, Non Final Office Action dated Aug. 7, 2017", 26 pgs.
"U.S. Appl. No. 13/765,695, Response filed Mar. 23, 2016 to Final Office Action dated Oct. 29, 2015", 19 pgs.
"U.S. Appl. No. 13/765,695, Response filed Jun. 29, 2017 to Final Office Action dated Feb. 9, 2017", 15 pgs.
"U.S. Appl. No. 13/765,695, Response filed Jul. 22, 2015 to Non Final Office Action dated Apr. 24, 2015", 16 pgs.
"U.S. Appl. No. 13/765,695, Response filed Jul. 31, 2015 to Non Final Office Action dated Apr. 24, 2015", 17 pgs.
"U.S. Appl. No. 13/765,695, Response filed Oct. 18, 2016 to Non Final Office Action dated Jul. 21, 2016", 13 pgs.
"European Application Serial No. 13753928.4, Office Action dated Jun. 9, 2017", 6 pgs.
"Chinese Application Serial No. 201380042548.6, Office Action dated Sep. 18, 2017", (w/ English Translation), 14 pgs.
"Chinese Application Serial No. 201380042555.6, Office Action dated Sep. 8, 2017", (w/ English Translation), 10 pgs.
"European Application Serial No. 13753929.2, Office Action dated Sep. 19, 2017", 6 pgs.
Webb, Chris, "Self-Service BI Mapping with Microsoft Research's Layerscape—Part 2", [online]. [retrieved on Oct. 9, 2017]. Retrieved from the Internet: <URL: https://blog.crossjoin.co.uk/2012/04/18/self-service-bi-mapping-with-microsoft-researchs-layerscapepart-2>, (Apr. 18, 2012), 6 pgs.
"U.S. Appl. No. 13/760,032, Notice of Allowance dated Sep. 27, 2017", 11 pgs.
"U.S. Appl. No. 13/765,695, Examiner Interview Summary dated Nov. 7, 2017", 3 pgs.
"U.S. Appl. No. 15/069,166, Non Final Office Action dated Oct. 19, 2017", 15 pgs.

\* cited by examiner

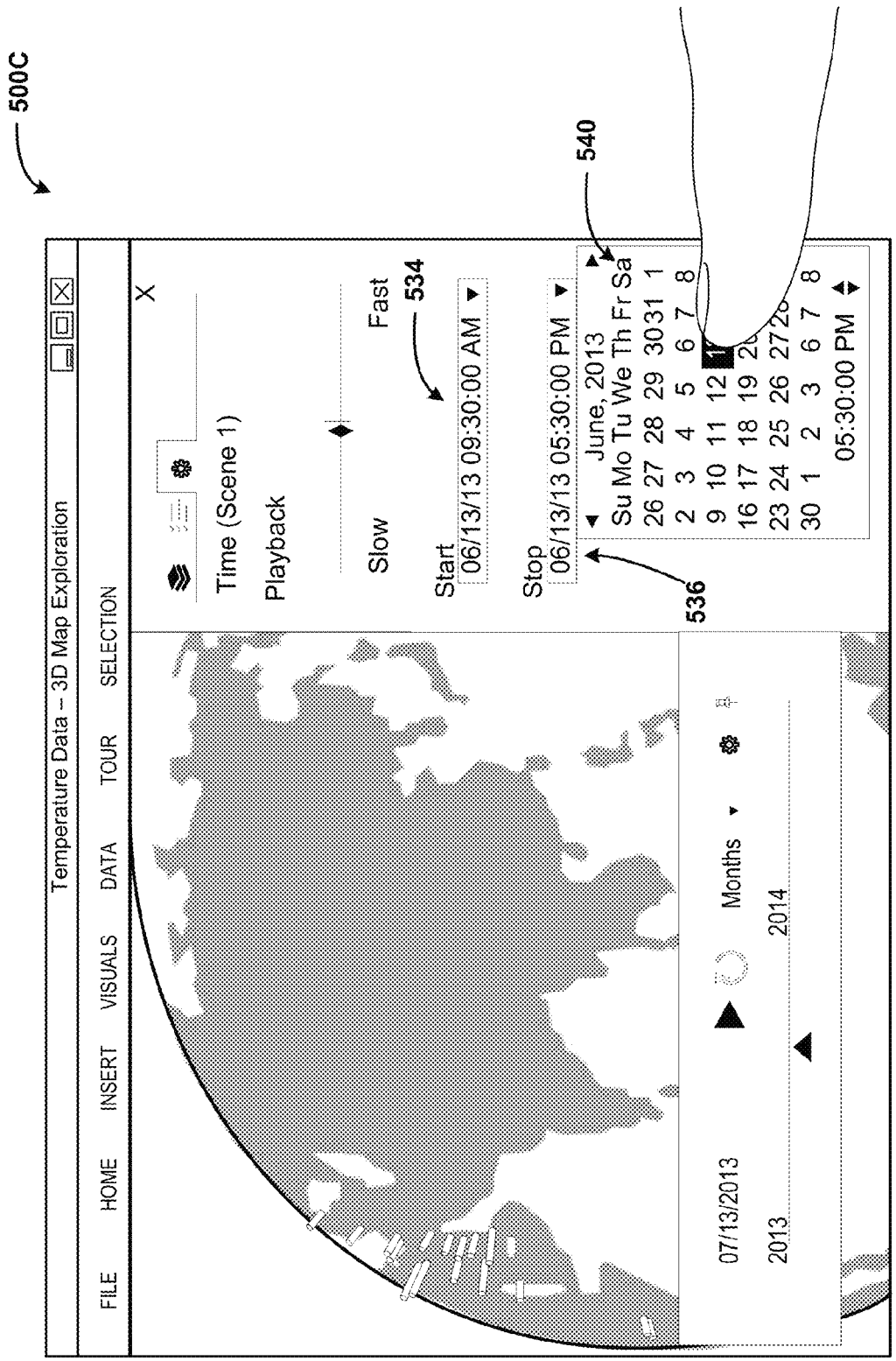

DISPLAYING TEMPORAL INFORMATION IN A SPREADSHEET APPLICATION

CROSS-REFERENCE TO RELATED APPLICATION

This application claims priority to U.S. Provisional Patent Application No. 61/681,851 entitled "3D Visualization of Data in Geographical and Temporal Contexts," filed Aug. 10, 2012, which is incorporated herein by reference in its entirety.

BACKGROUND

A spreadsheet application, reporting application, or other data presentation application may support presentation of data in two-dimensional and/or three-dimensional pie charts, graphs, bar charts, or the like. Thus, users can chart or graph some data to gain insight into the data, relationships among data points, trends, or the like. Some data, however, may include various data components that are not readily susceptible to graphing and therefore may not be appreciated and/or viewable by users.

In particular, some data may include a geographical component. Charts and graphs in spreadsheet applications may present geographical information, but typically the display of this information is limited to a color code or data label. The color code or data label can specify, for example, a ZIP code, city name, country, or the like associated with the data points charted or graphed in the spreadsheet application.

Similarly, some data may include a temporal component. Temporal data may be displayed in a spreadsheet application by way of showing a trend line, bar graphs, or the like. Thus, users may be able to view temporal information, but typically the presentation of the temporal information may be limited to displaying data points at particular specified time points. When geographical and temporal information are included in data, the presentations of the data may be inadequate to discover the relationships of the data in the geographical and temporal contexts.

It is with respect to these and other considerations that the disclosure made herein is presented.

SUMMARY

Concepts and technologies are described herein for displaying temporal information in a spreadsheet application. In accordance with the concepts and technologies disclosed herein, a computer system can execute a visualization component. The visualization component can be included in a spreadsheet application and/or can be configured to present visualizations of spreadsheet data. As used herein, a "visualization" can include an animated rendering of spreadsheet data over time on a map, globe, or other surface that can provide geographical context. According to various embodiments, each frame or image of the animation can correspond to a time associated with the spreadsheet data.

Embodiments of the concepts and technologies disclosed herein allow presentation of data in visualizations based, at least in part, upon geographical information and/or time values, timestamps, and/or other temporal information included in the data. According to various implementations, data can be plotted over time and animated in the visualization. The visualization can include a rendered globe or map that shows the data in corresponding locations on the map or globe, based upon geographical information and/or other location data included in the data.

According to one aspect, the computer system obtains spreadsheet data. The spreadsheet data can include data values, temporal information, and geographic location information. The computer system can access one or more geocoding services to obtain geographic mapping data. The computer system can use the geographic mapping data to map the geographic location information included in the spreadsheet data to geographic coordinates and/or other geocoded information. The computer system also can obtain map data, for example from a map server. The map data can include map images that are joined together by the computer system and visually wrapped onto a virtual globe to provide the visualization.

According to another aspect, the computer system can determine a time range and animation speed associated with the visualization. In some embodiments of the concepts and technologies disclosed herein, the time range and the animation speed can be bound to one another, and as such, changes to the time range can effect changes to the animation speed, or vice versa. In some embodiments, the time range can correspond to a time over which the data represented in the visualization are to be rendered and the animation speed can correspond to a number of frames per second in the animation. The computer system also can determine if time is to be accumulated in the visualization. According to various implementations, accumulated time can be displayed by showing a cumulative total of data values at a particular data point instead of, or in addition to, a discrete data value at the data point at a particular time. The computer system can also determine if time decay is to be shown, which can be used to smooth appearance and disappearance of data points in the visualization. The computer system can generate the visualization, data labels if included, and output the visualization.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5E are user interface diagrams showing aspects of user interfaces for displaying temporal information in a spreadsheet application, according to various illustrative embodiments.

DETAILED DESCRIPTION

Figure 1:
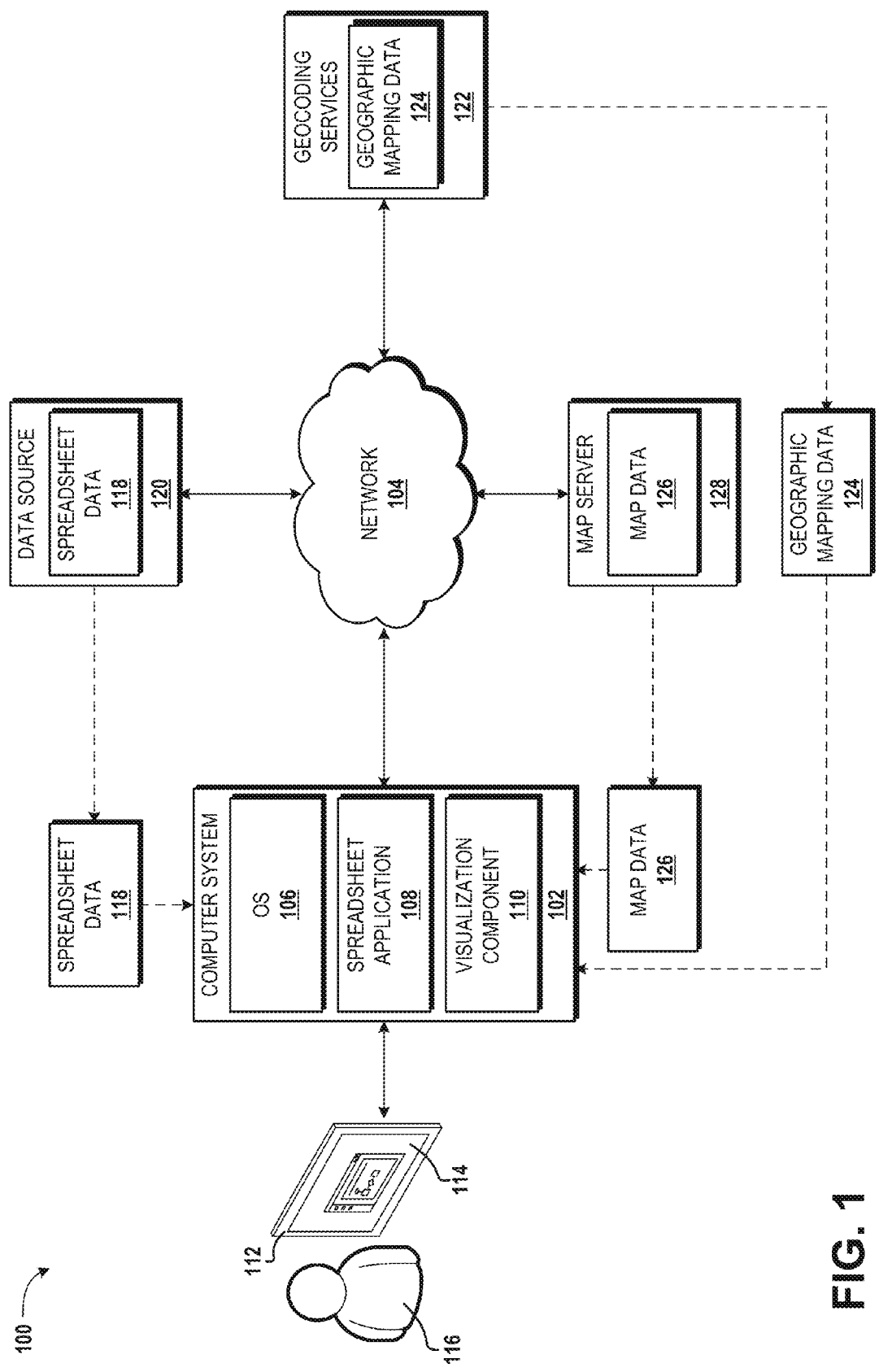
FIG. 1 is a system diagram illustrating an illustrative operating environment for the various embodiments disclosed herein.

The following detailed description is directed to concepts and technologies for displaying temporal information in a spreadsheet application. According to the concepts and technologies described herein, a computer system can execute a visualization component, which can be included in a spreadsheet application and/or can communicate with the spreadsheet application to generate visualizations of spreadsheet data. The computer system can obtain spreadsheet data that includes data values, temporal information, geographic location information, and/or other data or information. The computer system can store or access geographic mapping data that may be used to map the geographic location information included in the spreadsheet data to geographic coordinates and/or other geocoded information. The computer system also can store or obtain map data that includes map images that can be joined together by the computer system and visually wrapped onto a virtual globe to provide the visualization.

The computer system can determine a time range and animation speed associated with the visualization. The time range and animation speed can be specified by user or program settings and/or obtained as input from a user via a user interface. The time range and animation speed also can be automatically determined by the computer system based upon the spreadsheet data and/or other information. IN some embodiments, the time range and the animation speed can be bound to one another, wherein changes to the time range can cause a change in the animation speed and/or wherein a change to the animation speed can affect the time range. The computer system also can determine if time is to be accumulated in the visualization based upon options, settings, and/or user input. If selected or otherwise specified, accumulated time can be displayed in the visualization by showing a cumulative total of data values at a particular data point during the visualization. The computer system can also determine if time decay is to be shown based upon settings and/or input. Time decay can be applied to the visualization to persist data points in the visualization for a specified time period. The computer system can generate the visualization, data labels if included, and output the visualization.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for displaying temporal information in a spreadsheet application will be presented.

Referring now to FIG. 1, aspects of one operating environment 100 for the various embodiments presented herein will be described. The operating environment 100 shown in FIG. 1 includes a computer system 102 operating as a part of and/or in communication with a communications network ("network") 104. According to various implementations of the concepts and technologies disclosed herein, the functionality of the computer system 102 can be provided by a cloud-based computing platform that can be provided by one or more application servers, Web servers, data storage systems, network appliances, dedicated hardware devices, and/or other server computers or computing devices.

According to some other embodiments, the computer system 102 can include a user computing device, such as a tablet computing device, a personal computer ("PC"), a desktop computer, a laptop computer, a notebook computer, a cellular phone or smartphone, other mobile computing devices, a personal digital assistant ("PDA"), or the like. Some example architectures of the computer system 102 are illustrated and described below with reference to FIGS. 6-8. For purposes of illustrating and describing the concepts and technologies disclosed herein, the functionality of the computer system 102 is described herein as being provided by a server computer. In light of the above alternative embodiments of the computer system 102 described above, it should be understood that this example is illustrative, and should not be construed as being limiting in any way.

The computer system 102 can be configured to execute an operating system 106 and one or more application programs such as, for example, a spreadsheet application 108, a visualization component 110, and/or other application programs. The operating system 106 is a computer program for controlling the operation of the computer system 102. The application programs are executable programs configured to execute on top of the operating system 106 to provide the functionality described herein for displaying temporal information in a spreadsheet application.

In particular, the spreadsheet application 108 can be configured to create, manipulate, store, and/or otherwise interact with tabular or other structured data such as spreadsheets. According to some embodiments of the concepts and technologies disclosed herein, the functionality of the spreadsheet application 108 can be provided by a member of the MICROSOFT EXCEL family of spreadsheet applications from Microsoft Corporation of Redmond, Wash. In some other embodiments, the functionality of the spreadsheet application 108 can be provided by a database application, a data reporting application, a data presentation application, combinations thereof, or the like.

According to some implementations, the spreadsheet application 108 can be executed by one or more server computers in the computer system 102, such as application servers and/or Web servers. Thus, the functionality of the spreadsheet application 108 can be accessed by other computing devices and/or accessed at the computer system 102. In the illustrated embodiment, the functionality of the spreadsheet application 108 can be accessed and/or interacted with by a user computing device 112. The functionality of the user computing device 112 can be provided by, for example, a tablet computing device, a smartphone, a laptop computer, a desktop computer, other computing devices, combinations thereof, or the like. The user computing device 112 can communicate with the computer system 102 over one or more links or networks such as, for example, the network 104, a private network, a direct wireless or wired connection, the Internet, and/or combinations of these and other networks and/or communication links.

Although not visible in FIG. 1, the user computing device 112 can execute one or more client applications. The client applications can include Web browser applications and/or other applications for accessing the spreadsheet application 108 executing on the computer system 102. In some embodiments, the spreadsheet application 108 can be executed locally on the user computing device 112 or other devices that can include the functionality of the computer system 102 described herein. The spreadsheet application 108 can be implemented as hardware, software, and/or a combination of the two. Furthermore, the spreadsheet application 108 can include one or more application program modules and other components on the user computing device 112, the computer system 102, and/or other computing platforms. As will be explained in more detail herein, the computer system 102 and/or the user computing device 112 can generate and/or present one or more user interfaces ("UIs") 114. The UIs 114 can be provided to the user computing device 112 for presentation to a user 116.

According to various embodiments, the spreadsheet application 108 can be configured to generate, manipulate, and/or store tabular or other structured data that can be included in spreadsheet data 118. The spreadsheet data 118 also can be stored in tables of a database, objects stored in an object store, or the like. Because the functionality of the spreadsheet application 108 is generally understood, the spreadsheet application 108 will not be described in additional detail herein.

According to various implementations, the spreadsheet data 118 can be obtained by the computer system 102 from a local or remote data source 120. In some embodiments, the data source 120 can include a memory, disk drive, or other data storage element of or associated with the computer system 102. In some other embodiments such as the embodiment illustrated in FIG. 1, the data source 120 can include a network drive, a server computer operating as a part of and/or in communication with the network 104, a database or other real or virtual data storage elements, and/or other data storage devices. As such, it should be understood that the data source 120 can include almost any type of data storage device that is local to and/or remote from the computer system 102.

The visualization component 110 can be configured to obtain the spreadsheet data 118 from the spreadsheet application 108 and/or directly from the data source 120, and to generate, based upon the spreadsheet data 118, three-dimensional visualizations of the spreadsheet data 118 in a geographical and/or temporal context. In some embodiments, the visualization component 110 can be implemented as a component of the spreadsheet application 108, and in some embodiments, the visualization component 110 can be implemented as a component separate from the spreadsheet application. Thus, while the spreadsheet application 108 and the visualization component 110 are illustrated as components of the computer system 102, it should be understood that each of these components, or combinations thereof, may be embodied as or in stand-alone devices or components thereof operating on or in communication with the network 104 and/or the computer system 102. Thus, the illustrated embodiment is illustrative, and should not be construed as being limiting in any way.

In some embodiments, the visualization component 110 may be implemented as a plugin or add-in for the spreadsheet application 108. In some other embodiments, the visualization component 110 can include a service and/or set of application programming interfaces ("APIs") that can provide the functionality described herein. Thus, it should be appreciated that the visualization component 110 can be implemented as hardware, software, or a combination thereof.

According to various embodiments of the concepts and technologies disclosed herein, the visualization component 110 can be configured to access one or more geocoding services 122. The geocoding services 122 can be configured to map geographical data included in the spreadsheet data 118 to geographic information. Thus, for example, the visualization component 110 can provide geographical data included in the spreadsheet data 118 such as, for example, a street address, a city, a state, a ZIP code, or the like, to the geocoding services 122. The geocoding services 122 can map this geographical data to latitude and longitude information and/or other geocoded location data. Thus, it can be appreciated that the geocoding services 122 can be called by the computer system 102 via one or more APIs exposed by the geocoding services 122, though this is not necessarily the case. Furthermore, the geocoding services 122 can be configured to provide geographic mapping data 124 representing mappings of the geographical data to the geocoded location data to the computer system 102, though this is not necessarily the case.

In some embodiments, the visualization component 110 can access the geocoding services 122 via one or more networks such as, for example, the network 104, the Internet, other networks, and/or a combination thereof. In some other embodiments, the geocoding services 122 can be implemented on the computer system 102. In one contemplated embodiment, the geocoding services 122 are implemented as a component of the visualization component 110. It should be understood that this embodiment is illustrative, and should not be construed as being limiting in any way.

The visualization component 110 also can be configured to obtain and/or access map data 126. The map data 126 can be used to provide geolocation and/or graphical data for the creation of the three-dimensional geographical maps as described herein. The visualization component 110 may be configured to obtain or access the map data 126 from or at a computing device such as, for example, a map server 128. In some embodiments, the functionality of the map server 128 can be provided by a mapping application executed by a search engine such as the BING search engine from Microsoft Corporation in Redmond, Wash. Because the functionality of the map server 128 can be provided by additional and/or other devices and/or applications, it should be understood that this embodiment is illustrative, and should not be construed as being limiting in any way.

The computer system 102 can access the map server 128 via one or more networks such as, for example, the network 104. In some embodiments, the visualization component 110 can be configured to access map tiles from the map data 126, and to stich the map tiles together over a three-dimensional globe armature to create a three-dimensional geographic globe. The visualization component 110 can be configured to use geocoded location data such as latitude and longitude data from the geocoding services 122 to place visualizations of data included in the spreadsheet data 118 on the three-dimensional geographic globe. As such, various embodiments of the visualization component 110 can be configured to generate displays of geographic data in a visualization.

As used herein, a "visualization" can include an animation scene or tour of multiple scenes that represent the spreadsheet data 118 on a globe, map, or other representation of location. The spreadsheet data 118 can be displayed on the globe, map, or the like at points corresponding to geographic location data included in the spreadsheet data 118. The visualization also can show data changes over time.

The user 116 may interact with the spreadsheet application 108 and the visualization component 110 to create and/or navigate a three-dimensional visualization of the spreadsheet data 118 through a display of the user computing device 112. In some embodiments, the user 116 may use one or more input devices of the user computing device 112 such as a touchscreen, a keyboard, a mouse, a game controller, combinations thereof, or the like. The UIs 114 can be presented on the touchscreen, a monitor, a display, other display surfaces or devices, combinations thereof, or the like.

The visualization component 110 also can be configured to provide the functionality described herein for displaying temporal information in a spreadsheet application. In particular, the computer system 102 can be configured, via execution of the visualization component 110, to determine how time is to be presented in a visualization. In particular, the computer system 102 can determine a time range and an animation speed for a visualization. The computer system 102 also can determine if time accumulation, time decay, time chunking, temporal tower visualizations, and/or time persistence are to be enabled for the data shown in the visualization. These options for presenting data with respect to time are described in additional detail below.

A "time range," can be used herein to refer to a time duration of the data points that is to be represented in the visualization. The time range can be defined as a duration of time between a start time and an end time. The timer range can be automatically determined by the computer system 102 based upon an analysis of the spreadsheet data 118 and/or can be specified by a user or other entity. For example, a user can specify a time range based upon a determination a duration of time over which the user wishes to present the data. As explained above, the time range and the animation speed of a visualization can be bound to one another. As such, a modification to the animation speed can effect a modification to the time range and vice versa. Thus, a user may specify a time range of particular interest such as, for example, a particular hour, day, week, month, quarter, year, decade, century, or the like. Because the time range can be specified as additional and/or alternative amounts of time, it should be understood that this embodiment is illustrative, and should not be construed as being limiting in any way.

In some embodiments, the computer system 102 can determine the time range over which to show the visualization based upon the spreadsheet data 118. In particular, the computer system can be configured to determine an earliest time included in the spreadsheet data 118 and a latest time included in the spreadsheet data 118, and to define the time range as being bound by these two times. Thus, for example, if the earliest time data associated with the spreadsheet data 118 corresponds to Jan. 1, 2014 and the latest time data associated with the spreadsheet data 118 corresponds to Jan. 1, 2015, the computer system 102 can determine that the time range is to correspond to one year beginning on Jan. 1, 2014.

In yet other embodiments, the computer system 102 can determine a time range based upon an analysis of the spreadsheet data 118 and assumptions as to what time ranges are likely to be of interest to a user or other entity. Thus, for example, if a data set includes one hundred data points, with ninety of the data points occurring within a one month range and the remainder of the data points occurring over a year period before and/or after the one month range, the computer system 102 may determine that the one month range is to be defined as the time range, and that the other data points are not to be represented in the visualization. This example is illustrative and should not be construed as being limiting in any way.

"Animation speed" can refer to a rate at which time among the data points is represented in the visualization. In particular, the computer system 102 can be configured to present the spreadsheet data 118 in a visualization over a default time. In some embodiments, the default time can correspond to ten seconds, twenty seconds, thirty seconds, other times, or the like. The default time can be specified by a user, application setting, preferences, or the like, and/or can be based upon an assumption that a user or other viewer wishes to watch an animated sequence for a time corresponding to the default time. Thus, whether the spreadsheet data 118 includes three hundred records or three thousand records, the animation can last the defined duration. To meet the defined duration, the computer system 102 and/or a user can adjust the animation speed.

In some embodiments, however, the computer system 102 can be configured to impose a maximum animation speed such as, for example, fifteen milliseconds. The animation speed also can be limited by the computer system 102, in some embodiments. In some implementations, this maximum animation speed can be imposed to allow the computer system 102 resources to draw each animation frame without negatively impacting performance of the computer system 102. Because the maximum animation speed can be omitted and/or can correspond to other rates, it should be understood that this embodiment is illustrative, and should not be construed as being limiting in any way.

Also, while animation speed is disclosed herein as generally referring to a fixed rate for a particular visualization or animation, it should be understood that the animation speed and/or a granularity of time represented by the animation speed can vary during a visualization. Thus, while animation frames may be generated with a uniform advance of the clock for an associated time range, this is not necessarily the case. In particular, data may be clustered in some time intervals in a time range with gaps between the intervals. Generating animation frames for these gaps may not be useful since no data may be displayed in some of the animation frames. Thus, the computer system 102 can be configured to generate the animation frames that will include data while skipping animation frames and/or time intervals that will not include data. In some embodiments, this approach can enable display of animation frames for which data is displayed for a comparatively longer time because the time represented by each animation frame in the animation sequence may be proportionately larger. It should be understood that this embodiment is illustrative, and should not be construed as being limiting in any way.

"Time accumulation" can refer to visually accumulating data values over time as opposed to and/or in addition to merely showing a distinct value at a particular time corresponding to the data value. To illustrate this concept in more detail, an example data set is provided below in TABLE 1.

TABLE 1

| Time | Value |
|---|---|
| January 1, 2014 08:00:00 AM | 2 |
| January 1, 2014 08:01:00 AM | 1 |
| January 1, 2014 08:02:00 AM | 0 |
| January 1, 2014 08:03:00 AM | 4 |
| January 1, 2014 08:04:00 AM | 1 |
| January 1, 2014 08:05:00 AM | 3 |
| January 1, 2014 08:06:00 AM | 3 |
| January 1, 2014 08:07:00 AM | 5 |
| January 1, 2014 08:08:00 AM | 4 |
| January 1, 2014 08:09:00 AM | 5 |

It can be appreciated that if the data of TABLE 1 is shown in a visualization, and if each of the data points of TABLE 1 is represented by a frame in the visualization, that a column showing the value at the respective times will grow (at 8:03 AM, 8:05 AM, 8:07 AM, and 8:09 AM), shrink (at 8:01 AM, 8:04 AM, and 8:08 AM) and/or disappear (at 8:02 AM) in response to the changing values of that particular data point. If time accumulation is enabled, however, the column will appear at a scene time corresponding 8:00 AM with a value of 2, and then grow at a scene time corresponding to each of data points that include any value greater than zero. Thus, as shown in TABLE 2 below, the magnitude of a column corresponding to the data point will have a value as follows at scene times corresponding to the times of TABLE 1.

TABLE 2

| Time | Column Value (Cumulative) |
|---|---|
| January 1, 2014 08:00:00 AM | 2 |
| January 1, 2014 08:01:00 AM | 3 |
| January 1, 2014 08:02:00 AM | 3 |
| January 1, 2014 08:03:00 AM | 7 |
| January 1, 2014 08:04:00 AM | 8 |
| January 1, 2014 08:05:00 AM | 11 |
| January 1, 2014 08:06:00 AM | 14 |
| January 1, 2014 08:07:00 AM | 19 |
| January 1, 2014 08:08:00 AM | 23 |
| January 1, 2014 08:09:00 AM | 28 |

As such, it can be appreciated that time accumulation can be used to allow users to see accumulation of values over time, which may be desirable in certain data analysis contexts. While the example shown in TABLE 2 illustrates aggregating or accumulating the values as a sum, it should be understood that this example is illustrative. In particular, additional and/or alternative aggregation functions can be used for aggregated and/or accumulated data. In particular, contemplated examples of aggregation functions include, but are not limited to, identifying a maximum over the aggregated time range, determining an average value over the aggregated time range, showing a moving average over the aggregated time range, combinations thereof, or the like. As such, it should be understood that this embodiment is illustrative, and should not be construed as being limiting in any way.

"Time decay" or "time delay" can be used to refer to an amount of time over which an echo or persistence of a data point is shown in a visualization. Once a data event such as a data point is over, for example the data point at the next represented time is zero, the data point may disappear from the visualization if time accumulation is deactivated. The time decay option can be used to fade the data point out of the visualization instead of allowing the data point to immediately disappear in such a situation. To implement time decay, the computer system 102 can be configured to show a representation of data such as a column or point at full opacity and adjust the opacity to zero percent over the defined time decay. Thus, for example, if a time decay of fifty milliseconds is defined, a data point or column may be represented (at varying degrees of opacity) over a fifty millisecond interval prior to disappearing from the visualization. It should be understood that this embodiment is illustrative, and should not be construed as being limiting in any way.

"Time chunking" can refer to grouping or time banding a times and/or time ranges into user-specified time chunks. The time chunks can include, for example, days of the week, weeks of the month, months of the year, quarters of the year, combinations thereof, or the like. According to various embodiments, the computer system 102 can be configured to present an aggregated data point at each location in the visualization. In some embodiments, the data point can be generated for each time chunk. Thus, for example, if the time chunked data corresponds to sales data that is time chunked by month, sales for the month may be summed together and an aggregated sales amount for the month may be displayed for the entire month during playback of the visualization or animation. Additionally, or alternatively, the time chunked data can be further accumulated. For example, the time chunked data may be displayed as cumulative monthly sales for the year to date if the computer system 102 accumulates sales data that is time chunked by month. It should be understood that this embodiment is illustrative, and should not be construed as being limiting in any way.

According to some embodiments of the concepts and technologies disclosed herein, time chunking also can be used during visualization of data that cannot be or is not readily susceptible to being aggregated. For example, data corresponding to earthquake intensities may not be readily susceptible to aggregation over time. Thus, the computer system 102 can be configured to time band a time range included in the data and to display data points that fall within the time band (time chunk) for the duration of the time chunk. As such, some embodiments of the concepts and technologies disclosed herein can be configured to display an earthquake that occurred in January for an amount of time during the playback of the visualization that corresponds to the entire month of January. In this example, because the visualizations of the data points may overlap, the data points may be shown separately such as by stacking the points or otherwise distinguishing the data points from each other in the visualization. One example embodiment of temporal tower visualizations is described below.

"Temporal tower visualizations" or "persist all" visualizations can be used to refer to visualizations or representations of data in a stacked or other relationship. In some embodiments, the temporal tower visualizations may be used to show data that may or may not be aggregatable. For example, if the data corresponds to earthquake dates, locations, and/or magnitudes as in the example above, it can be appreciated that the data may not be readily susceptible to aggregation. Thus, embodiments of the concepts and technologies disclosed herein can be configured to support display of data that are not readily understood if aggregated by displaying individual points over time at the same location without overlapping the individual points. This approach to displaying data is referred to herein as temporal tower visualization.

In one contemplated embodiment, the temporal tower visualizations can be displayed as stacked data points that can form a tower. It should be understood that this is only one possible visualization of the data. In particular, various embodiments of the concepts and technologies disclosed herein can display these data as clusters of data points around a location, or the like. Similarly, this approach to displaying data can be used for displaying non-temporal data such as, for example, visualizing earthquake counts and/or magnitudes without any time dimension. One example of temporal tower visualizations of data is illustrated and described below with reference to FIG. 5E.

"Time persistence" can refer to leaving a representation of data such as a column or point until a value at the corresponding geographic location of the data point or column is determined to exist in the spreadsheet data 118 represented in the visualization. Thus, the computer system 102 can persist a column of, for example, a magnitude corresponding to ten units until a data point having a non-zero value is determined to exist at the same point. Thus, time persistence can be used by the computer system 102 to prevent a data point or other representation from disappearing from the visualization. It should be understood that this embodiment is illustrative, and should not be construed as being limiting in any way.

According to various embodiments, the computer system 102 can obtain spreadsheet data 118 from a data source such as the data source 120. The spreadsheet data 118 can include a set of data points ("data set") having values, timestamps, and location information. As such, a particular data point of the data set can include a value, a corresponding location, and a corresponding time. The computer system 102 can identify a time component of the spreadsheet data 118, and generate a visualization of the spreadsheet data 118 based upon at least the time component.

According to some implementations, the computer system 102 can generate the visualization by determining and applying various time-related visualization options. In particular, the computer system 102 can be configured to determine a time range for the visualization, determine a time decay for the visualization, and/or determine an animation speed for the visualization. The computer system 102 also can determine if time accumulation and/or time persistence are to be shown in the visualization.

The computer system 102 can apply the determined time-related visualization options to the spreadsheet data 118 to generate animation frames. The animation frames can correspond to one or more (or each) time point represented over the determined time range. The computer system 102 also can be configured to generate data labels corresponding to the data presented in the visualization, if desired. The computer system 102 can then present the visualization or output the visualization to the user computing device 112. Thus, the visualization can be viewed on or at the UI 114 of the user computing device 112, though this is not necessarily the case.

FIG. 1 illustrates one computer system 102, one network 104, one user computing device 112, one data source 120, one instance of geocoding services 122, and one map server 128. It should be understood, however, that some implementations of the operating environment 100 can include multiple computer systems 102, multiple networks 104, multiple user computing devices 112, multiple data sources 120, multiple instances of the geocoding services 122, and/or multiple map servers 128. As such, the illustrated embodiment of the operating environment should be understood as being illustrative, and should not be construed as being limiting in any way.

Figure 2:
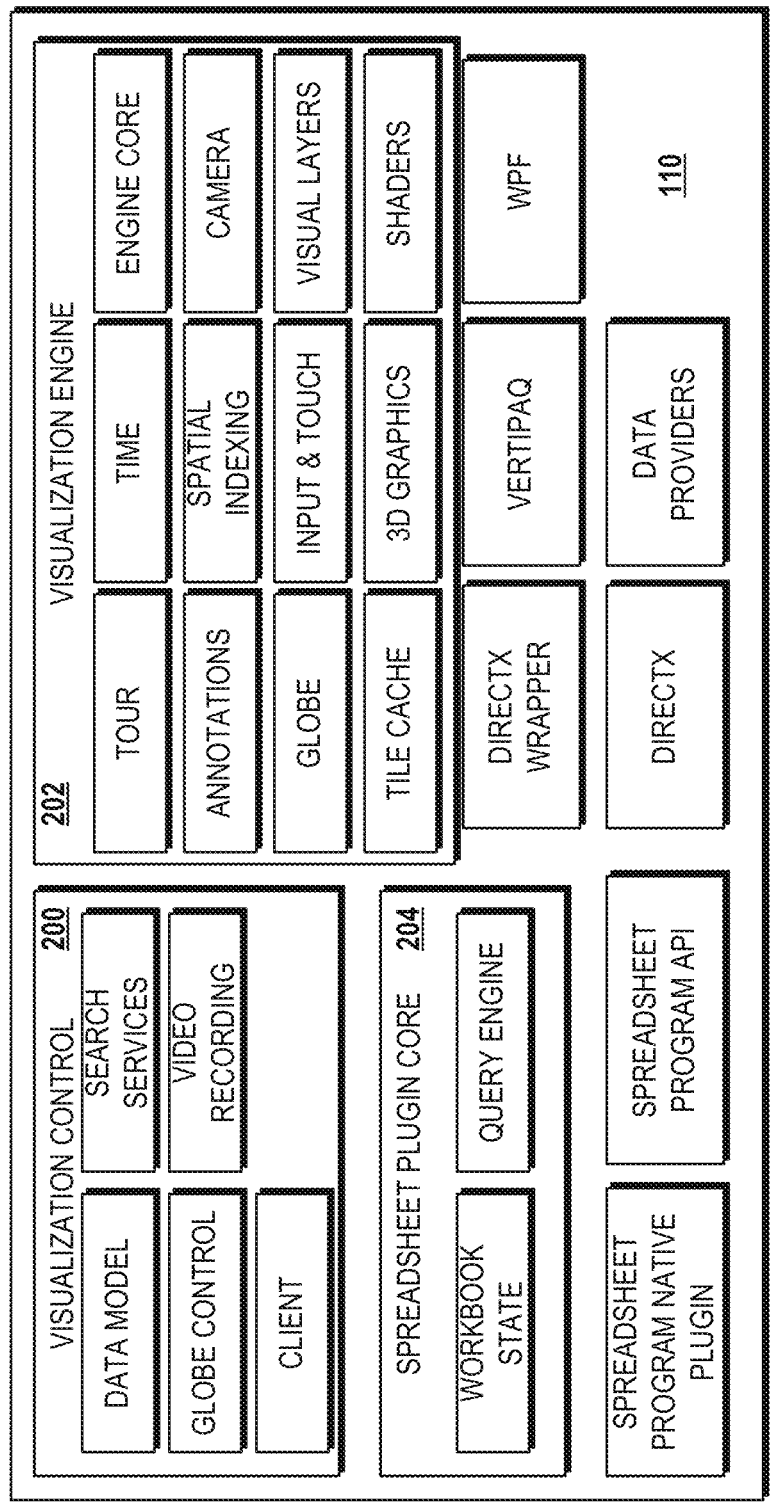
FIG. 2 is a block diagram showing aspects of a visualization component, according an illustrative embodiment.

Turning now to FIG. 2, additional aspects of the visualization component 110 will be presented, according to one illustrative embodiment. In particular, FIG. 2 provides further details regarding architecture and subcomponents of the visualization component 110, according to some embodiments. The visualization component 110 can include a number of components and/or subsystems including, but not limited to, a visualization control 200, a visualization engine 202, a spreadsheet plugin core 204, and/or other components and/or subsystems.

The visualization control 200 can include functionality for representing data, performing searches and/or providing search services, a glob control for visualizing and/or presenting representations of the globe, video recording functionality for recording animations and/or videos of illustrated tours, and a client. The visualization engine 202 can include functionality for generating a tour including multiple scenes, images, and/or animation sequences; functionality for measuring and/or representing time in the visualization space; an engine core for providing the visualization component functionality described herein; annotations functionality for generating and/or rendering two-dimensional and/or three-dimensional annotations; spatial indexing functionality; and camera functionality. The visualization engine 202 also can include globe models and/or functionality for representing the globe; input and touch modules for interpreting touch and/or multi-touch commands as input; visual layers functionality for representing and/or interacting with layers of a visualization space; a tile cache for storing map tiles; a three-dimensional graphics module for generating and/or rendering three-dimensional visualizations; and shaders for providing shading of generated and/or rendered three-dimensional objects.

As used herein, a "layer" of a scene can correspond to a set of data having data values, geographic information, and time information. Thus, a particular scene may include multiple layers corresponding to, for example, household income and income tax rate over time at a number of geographic locations. Thus, by showing multiple layers in a visualization, a user or other entity may view changes in both types of data over time and with respect to location. It should be understood that this embodiment is illustrative, and should not be construed as being limiting in any way.

In some embodiments, the shaders can include or implement a number of algorithms to facilitate the rendering of the three-dimensional geographical visualizations of data described herein. For example, the visualization component 110 can implement a dark aura effect for disambiguating visualization of a number of similarly colored objects. A dark aura effect can include a visual treatment that allows a viewer, for example the user 116, to differentiate between items in a three-dimensional visualization space. When there are multiple, similarly colored columns in a three-dimensional visualization or view, some of these columns may be next to and/or behind one another in the three-dimensional view. Thus, the multiple columns may appear to be grouped together and/or may look like a single polygon. In some embodiments of the concepts and technologies disclosed herein, the dark aura effect can be added around one or more of the columns, thereby allowing the one or more columns to appear to stand out from one another. Because other visual effects are possible and are contemplated, it should be understood that this example is illustrative, and should not be construed as being limiting in any way.

In another example, the visualization component 110 may implement a GPU-based framework for asynchronous hit testing for large number of arbitrary three-dimensional elements. This may comprise adding "out-of-channel" color information to pixels of the objects rendered in the three-dimensional visualization that may be invisible to the viewer, but can contain information identifying the object. Thus, if a user taps, clicks, or otherwise interacts with a point in the three-dimensional visualization, the identity of the object represented by the selected pixel can be known without deconstructing the three-dimensional visualization and determining the object rendered at the selected location. This may be implemented in the GPU.

The spreadsheet plugin core 204 can include functionality for storing workbook state information, as well as a query engine for generating and/or executing queries against various data sources. In some embodiments, the query engine can be configured to generate a query based upon data stored in the spreadsheet data 118, and to submit the queries to a search engine. It should be understood that this embodiment is illustrative, and should not be construed as being limiting in any way.

Figure 3:
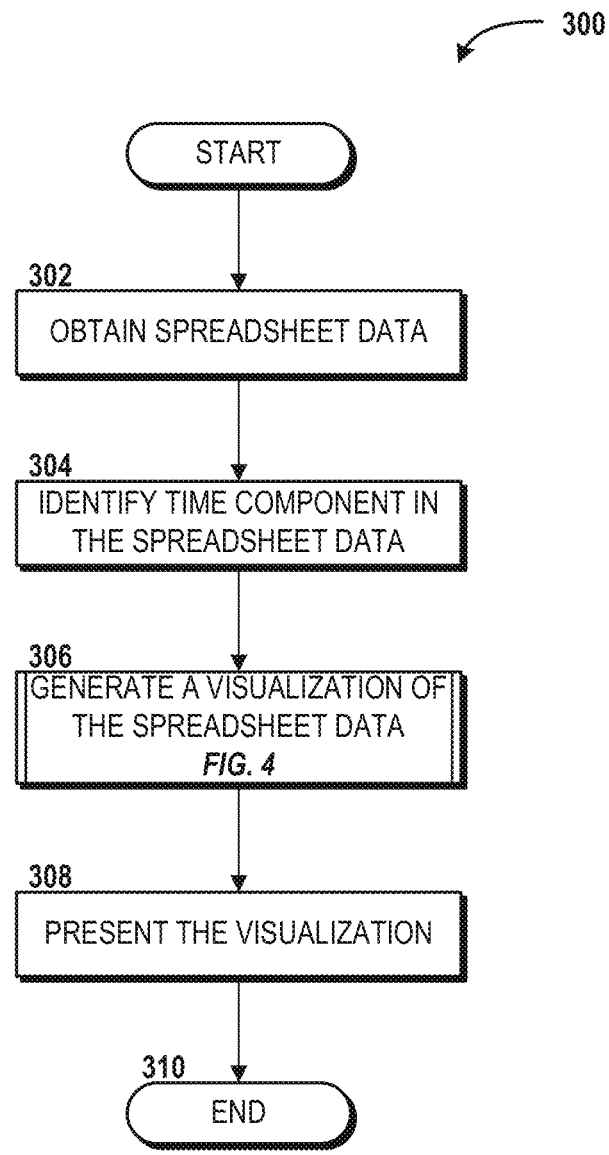
FIG. 3 is a flow diagram showing aspects of a method for presenting temporal information in a spreadsheet application, according to an illustrative embodiment.

The visualization component 110 also can include various other components and/or subsystems such as, for example, a spreadsheet program native plugin and a spreadsheet API such as, for example, a program command object model ("COM") API, a Java API, and/or other technologies such as Perl, Apple Cocoa framework, various server and/or client-side script execution environments or the like. The visualization component 110 also can include various graphics plugins and/or APIs such as the illustrated DIRECTX APIs, API call emulators such as the illustrated DIRECTX WRAPPER, a WINDOWS Presentation Foundation ("WPF") subsystem, combinations thereof, or the like. The visualization component 110 also can include analytics engines such as the illustrated VERTIPAQ engine and/or modules associated with other data providers, if desired. It should be appreciated that the visualization component 110 can include additional and/or alternative functionality not shown in FIG. 2. As such, the embodiment illustrated in FIG. 2 should be understood as being illustrative and should not be construed as being limiting in any way Turning now to FIG. 3, aspects of a method 300 for presenting temporal information in a spreadsheet application will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods disclosed herein can be ended at any time and need not be performed in their respective (or collective) entireties. Some or all operations of the methods disclosed herein, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the computer system 102 via execution of one or more software modules such as, for example, the visualization component 110. It should be understood that additional and/or alternative devices and/or network nodes can provide the functionality described herein via execution of one or more modules, applications, and/or other software including, but not limited to, the visualization component 110. Thus, the illustrated embodiments are illustrative, and should not be viewed as being limiting in any way.

The method 300 begins at operation 302, wherein the computer system 102 obtains spreadsheet data 118. As explained above, the spreadsheet data 118 can include various types of information or content such as, for example, spreadsheet files, database application data, and/or other types of information. In one contemplated embodiment, the spreadsheet data 118 corresponds to a spreadsheet file such as a file generated by a member of the MICROSOFT EXCEL family of spreadsheet application software products from Microsoft Corporation in Redmond, Wash. Other contemplated spreadsheet applications include, but are not limited to, a member of the GOOGLE DOCS family of programs, a member of the OPENOFFICE family of programs, a member of the APPLE IWORK NUMBERS family of programs, and/or other spreadsheet, table, and/or database programs. The spreadsheet data 118 can be obtained from a data storage device or component associated with the computer system 102. Some examples of data storage devices are described in more detail below with reference to FIGS. 6-8. In some other embodiments, the spreadsheet data 118 can be stored at or hosted by a remote storage device or resource such as the data source 120 described herein. Thus, the spreadsheet data 118 can be obtained by the computer system 102 via communications with the data source 120. As such, it should be understood that the spreadsheet data 118 can be obtained from any real or virtual device via a direct connection, via one or more networks, and/or via other nodes, devices, and/or device components.

From operation 302, the method 300 proceeds to operation 304, wherein the computer system 102 identifies a time component included in the spreadsheet data 118 obtained in operation 302. The time component can include, for example, a column or row of time data included in the spreadsheet data 118, time stamps or time values associated with data in the spreadsheet data 118, or the like. According to various embodiments, the time component can be measured in various amounts of time. For example, the time component can be measured in numbers of seconds, minutes, hours, days, weeks, months, quarters, years, and/or various portions of these and/or other time measures. Thus, the computer system 102 can, in operation 304, analyze the spreadsheet data 118 obtained in operation 302 to identify a time component of the spreadsheet data 118 and/or to identify units of time by which the time component of the spreadsheet data 118 is or are measured.

From operation 304, the method 300 proceeds to operation 306, wherein the computer system 102 generates a visualization of the spreadsheet data 118. Additional details of generating the display of the spreadsheet data 118 are illustrated and described in detail below with reference to FIG. 4. Briefly, the computer system 102 can determine, based upon preferences, options, configuration settings, user input, combinations thereof, or the like, various time-based visualization settings to be applied to the spreadsheet data 118. The time-based visualization settings can include, but are not limited to, a time range, a time decay, an animation speed, whether or not time is to be accumulated, and the like.

The computer system 102 can obtain and apply these and other options and/or settings to the spreadsheet data 118, and generate animation frames based upon these options and/or settings. The computer system 102 also can generate data labels, if desired. Thus, the computer system 102 can be configured to consider various options, settings, and/or input, and to apply that information to spreadsheet data 118 to generate a visualization that includes temporal information. Some illustrative UIs for obtaining these and other options, settings, and/or input are illustrated and described in more detail below with reference to FIGS. 5A-5E.

From operation 306, the method 300 proceeds to operation 308, wherein the computer system 102 presents the visualization. As explained above, the visualization can be presented in or as a UI 114 presented at the user computing device 112 and/or other computing devices. The UI 114 can be presented by or on a display, a touchscreen, a monitor, a projector, and/or other display device. From operation 308, the method 300 proceeds to operation 310. The method 300 ends at operation 310.

Figure 4:
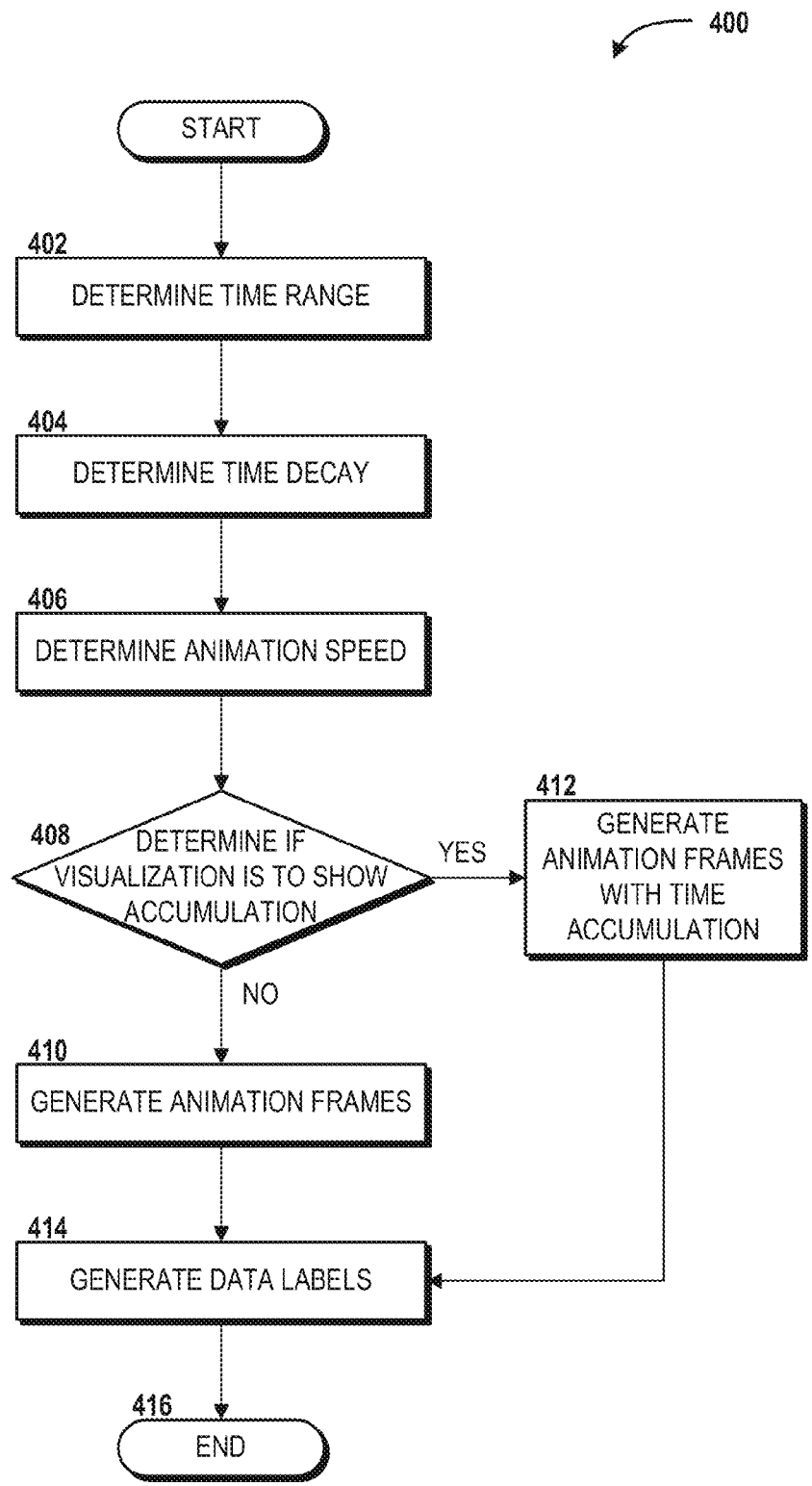
FIG. 4 is a flow diagram showing aspects of a method for generating a visual display of temporal information in a spreadsheet application, according to an illustrative embodiment.

Turning now to FIG. 4, aspects of a method 400 for generating a visual display of temporal information in a spreadsheet application will be described in detail. The method 400 begins at operation 402, wherein the computer system 102 determines a time range for the visualization. The time range determined in operation 402 can correspond to a time range associated with the spreadsheet data 118. In particular, as explained above in detail, the computer system 102 can be configured to analyze the spreadsheet data 118 to determine the time range in operation 402. As explained above, the computer system 102 can determine the time range based upon a time range included in the spreadsheet data 118, a time range determined to be particularly interesting or relevant, and/or based upon other considerations.

The computer system 102 also can determine the time range based upon user settings, configuration settings, program options, and/or input. An example user interface for obtaining data corresponding to the time range is illustrated and described with reference to FIGS. 5B-5C below. Because the time range can be determined in additional and/or alternative ways, it should be understood that these embodiments are illustrative, and should not be construed as being limiting in any way.

From operation 402, the method 400 proceeds to operation 404, wherein the computer system 102 determines a time decay for the visualization. In particular, the computer system 102 can determine a duration of the time decay in the visualization. In some embodiments, the time decay is disabled by a user or other entity, and as such the computer system 102 can determine, in operation 404, that the time decay corresponds to zero. In some other embodiments, the time decay duration may be a number of milliseconds, seconds, and/or other durations of time.

As explained above, the time decay can correspond to a time for which data points, columns, and/or other representations of data are persisted in the visualization after the data corresponding to the representation has become equal to zero, null, or the like. Thus, the time decay determined in operation 404 can be used to reduce or prevent sudden visual changes in the visualization. An example user interface for obtaining data for specifying the time decay is illustrated and described below with reference to FIG. 5D. Because the time decay can be obtained in other ways, for example as a user setting, default value, program option, or the like, it should be understood that this embodiment is illustrative, and should not be construed as being limiting in any way.

From operation 404, the method 400 proceeds to operation 406, wherein the computer system 102 determines an animation speed for the visualization. As explained in detail above, the animation speed can correspond to a rate at which the data points are shown in the visualization. The animation speed also can be set by program settings, user settings or options, and/or default values, or can be specified by a user or other entity as an input. The animation speed also can be determined by the computer system 102 based upon an analysis of the spreadsheet data 118 and a defined duration of a scene and/or visualization. As explained above, the duration of the scene and/or visualization also can be defined by settings, options, or the like and/or obtained from a user as input. Example user interfaces for obtaining data for specifying the animation speed is illustrated and described below with reference to FIGS. 5B-5C.

From operation 406, the method 400 proceeds to operation 408, wherein the computer system 102 determines if the visualization is to show time accumulation. As explained above, time accumulation can be used to show cumulative values of data points instead of, or in addition to, showing specific values at specific times. Thus, time accumulation can be used to show not only a particular data point at a particular time, but also a history of data over time. Time accumulation can be a user setting, option or the like; a program setting or default value; and/or an option specified by user input with respect to a particular scene or layer. An example user interface for obtaining data for specifying the animation speed is illustrated and described below with reference to FIG. 5A. Thus, the computer system 102 can determine, in operation 408, if a setting, option, configuration control, and/or user input indicates that the visualization is to show time accumulation.

If the computer system 102 determines, in operation 408, that the visualization is not to show time accumulation, the method 400 proceeds to operation 410. In operation 410, the computer system 102 can generate animation frames to generate the visualization. Because time accumulation is not selected for the visualization, the computer system 102 can generate each frame of the visualization independently without considering cumulative values, or the like, though this is not necessarily the case. An animation frame for one or more data points can be generated in operation 408 until data points associated with the time range are generated. It should be understood that the computer system 102 can be configured to drop some data points based upon the specified time range and/or animation speed, if desired.

If the computer system 102 determines, in operation 408, that the visualization is to show time accumulation, the method 400 proceeds to operation 412. In operation 412, the computer system 102 can generate the animation frames with time accumulation. Thus, operation 412 can be, but is not necessarily, similar to operation 410 described above, but the frames generated in operation 412 can include time accumulation. Thus, the computer system 102 can accumulate data values and generate representations of the accumulated data values in operation 408.

From operation 412, the method 400 proceeds to operation 414. The method 400 also can proceed to operation 414 from operation 410. In operation 414, the computer system 102 can generate one or more data labels for the visualization. The data labels can include text, images, or other representations that specify what the data represent in the visualization. Thus, the labels can include, for example, a data type, a data name, location information, color information, data value labels, combinations thereof, or the like. The computer system 102 can add the data labels to the visualization in operation 414. From operation 414. The method 400 proceeds to operation 416. The method 400 ends at operation 416.

Figure 5A:
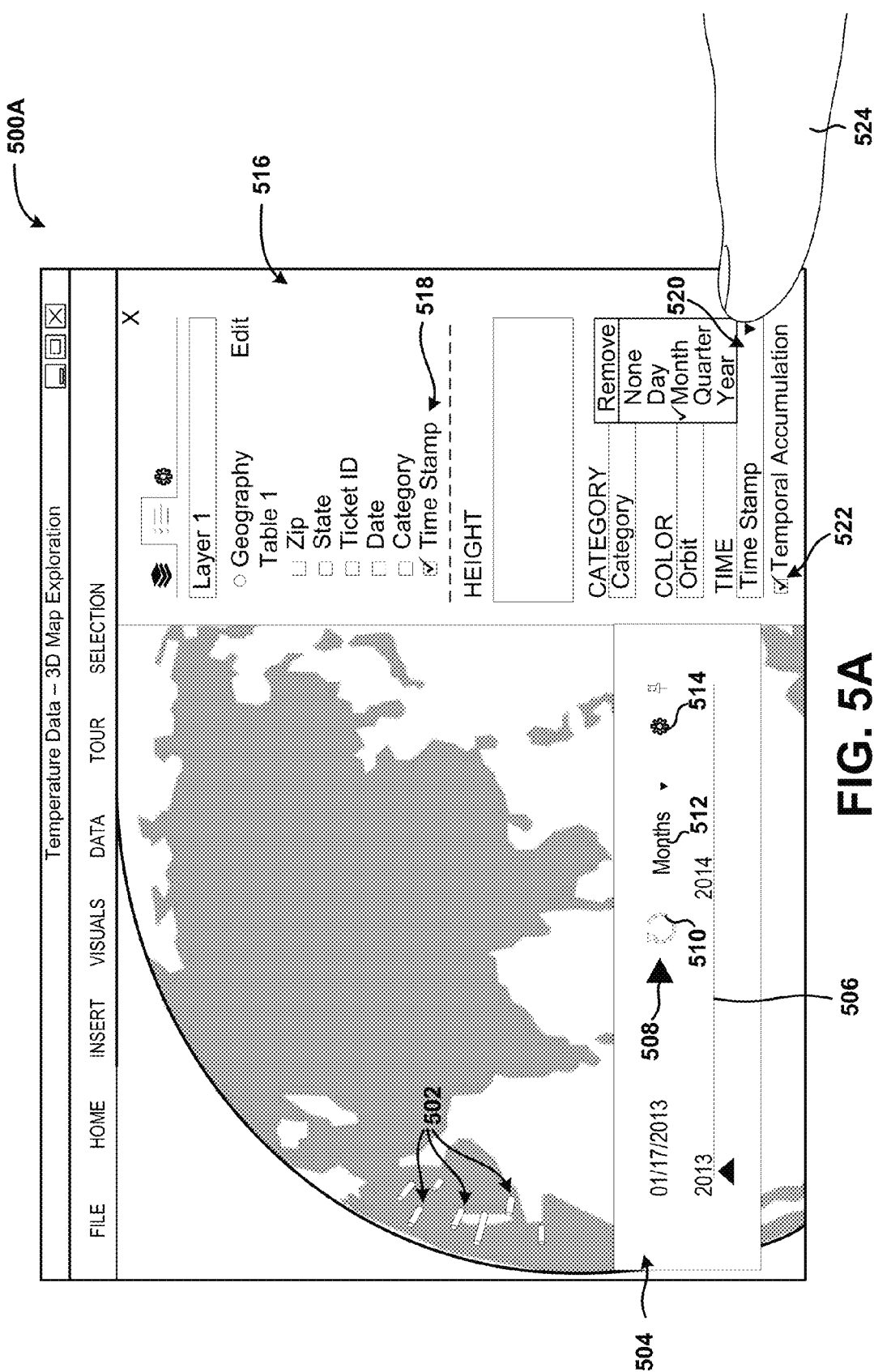

Turning now to FIGS. 5A-5E, UI diagrams showing various aspects of the concepts and technologies disclosed herein for displaying temporal information in a spreadsheet application will be described according to various illustrative embodiments. FIG. 5A shows an illustrative screen display 500A generated by a device such as the computer system 102 and/or the user computing device 112. In some embodiments, the screen display 500A can correspond to the UI 114 displayed by the user computing device 112, as shown in FIG. 1, though this is not necessarily the case. It should be appreciated that the UI diagram illustrated in FIG. 5A is illustrative of one contemplated example, and therefore should not be construed as being limited in any way.

As shown in FIG. 5A, the screen display 500A can include a three-dimensional visualization of data such as the spreadsheet data 118 described herein. More particularly, the screen display 500A is illustrated as displaying a globe with multiple data points illustrated on the globe in their corresponding locations and/or magnitudes as bars 502. Because the spreadsheet data 118 can be illustrated in additional and/or alternative structures other than the illustrated bars 502, it should be understood that the illustrated example is illustrative.

As shown in FIG. 5A, the screen display 500A can include a time control window 504. The time control window 504 can include a time scrubber 506, a UI control 508 for playing the visualization, a UI control 510 for repeating playback of the visualization, a UI control 512 for choosing a time decay for the visualization, a UI control 514 for accessing settings and/or properties, and/or other information and/or controls. The time scrubber 506 can be manipulated by a user to scroll through data points over time, and the time decay used for the visualization can be set by a user or other entity via the UI control 512.

Although not shown in FIG. 5A, some embodiments of the time control window 504 support time level zooming. Thus, for example, a user or other entity may interact with the time control window 504 to change a zoom level of the time scrubber 506. Thus, for example, the time scrubber 506, which is illustrated in FIG. 5A as having a zoom level of about two years, could be changed by a user or other entity to represent other time ranges from minutes to hundreds or even thousands of years. Thus, embodiments of the time control window 504 can support changing the time zoom level to allow a user to change time at a desired level of granularity. In some embodiments, the time control window 504 includes a scroll bar for modifying the time zoom level and/or other functionality and/or input can be used to make such a change. It should be understood that this embodiment is illustrative, and should not be construed as being limiting in any way.

The screen display 500A also includes a visualization component properties or settings bar ("settings bar") 516, which can be presented, for example, in response to a user or other entity selecting the UI control 514. The settings bar 516 is illustrated as displaying various properties associated with the visualization presented on the screen display 500A. As shown in FIG. 5A, a user or other entity has selected an option 518 to display spreadsheet data 118 based upon time stamps associated with the spreadsheet data 118.

The screen display 500A also shows a time display selection menu 520, via which a user or other entity can select a time decay or time unit used to display the spreadsheet data 118. According to various embodiments, as shown in FIG. 5A, selection of the time display selection menu 520 can cause the computer system 102 and/or the user computing device 112 to display various options for the time decay or time unit such as, for example, days, months, quarters, years, or the like. The screen display 500A is also illustrated as including an option 522 to select and/or deselect time accumulation as described herein.

In the illustrated embodiment, the screen display 500A can be presented on a touch-sensitive and/or multi-touch-sensitive display associated with a device such as the computer system 102 and/or the user computing device 112. For purposes of illustration, and not limitation, a user's finger 524 is illustrated proximate to the screen display 500A as if about to initiate an interaction with the screen display 500A. Because other input devices or structures can be used in accordance with the concepts and technologies disclosed herein, it should be understood that this embodiment is illustrative, and should not be construed as being limiting in any way.

Figure 5B:
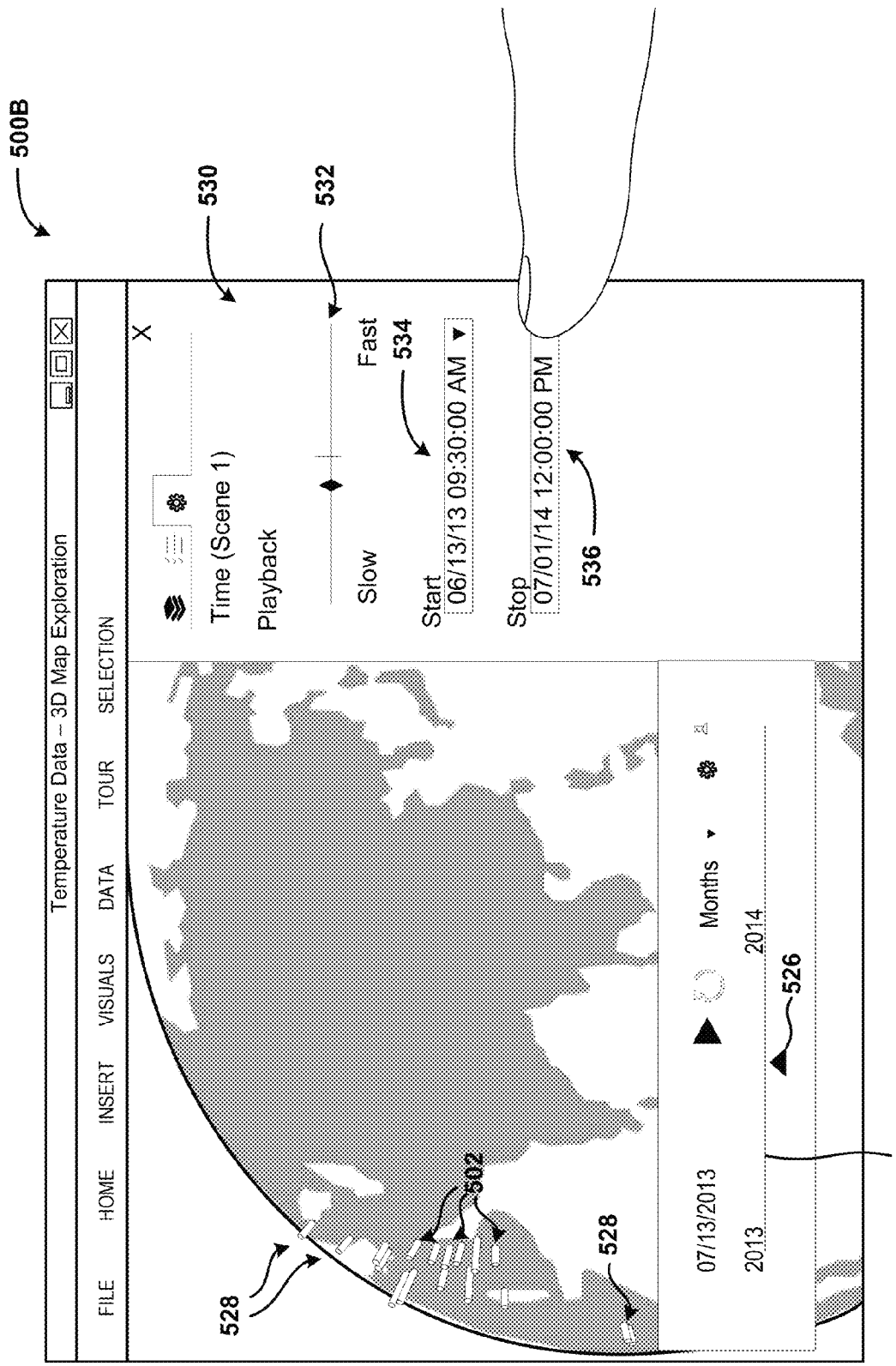

Referring now to FIG. 5B, a UI diagram showing additional aspects of the concepts and technologies disclosed herein for displaying temporal information in a spreadsheet application is described in detail. In particular, FIG. 5B shows a screen display 500B generated by a device such as the computer system 102 and/or the user computing device 112. In some embodiments, the screen display 500B corresponds to one or more of the UIs 114 shown in FIG. 1 and described above with reference to FIGS. 1-5A. It should be appreciated that the UI diagram illustrated in FIG. 5B is illustrative of one contemplated embodiment, and therefore should not be construed as being limiting in any way.

In FIG. 5B, a time position selector control 526 associated with the time control window 504 has been moved along the time scrubber 506. In response to the movement of the time position selector control 526, the bars 502 have changed to represent values associated with the respective data points of the bars 502. Furthermore, several new bars 528 have appeared on the screen display 500B (relative to the screen display 500A). It also can be appreciated that the sizes of some of the bars 502 has changed to reflect changes in the data values of the respective data points. It should be appreciated that because the option 522 for time or temporal accumulation has been selected, the bars 502 can get larger with changes to the underlying data to show accumulation of the data. The bars 502 can shrink if any of the data points have negative values, but this is not illustrated in FIG. 5B.

As shown in FIG. 5B, the screen display 500B also can include a time properties window 530. The time properties window 530 can be interacted with by a user or other entity to set various time-related properties associated with a particular scene. In the illustrated embodiment, the time properties window 530 can include a scene playback speed control 532. It can be appreciated that from the description of FIG. 4 that the scene playback speed control 532 can be used to set an animation speed, which can be determined by the computer system 102 in operation 406 of the method 400. It should be understood that this embodiment is illustrative, and should not be construed as being limiting in any way.

The time properties window 530 also can include UI controls 534, 536 for setting a time range for the scene. As shown in FIG. 5B, the time range can include a start time, which can be set via the UI control 534, and an end time, which can be set via the UI control 536. It can be appreciated that from the description of FIG. 4 that the UI controls 534, 536 can be used to set a time range, which can be determined by the computer system 102 in operation 402 of the method 400, though this is not necessarily the case. While the UI controls 534, 536 are illustrated as displaying an associated Julian date and twelve-hour formatted time, it should be understood that other time formats and/or date systems such as lunar calendars, twenty-four hour times, or the like can be used.

Turning now to FIG. 5C, a UI diagram showing additional aspects of the concepts and technologies disclosed herein for displaying temporal information in a spreadsheet application is described in detail. In particular, FIG. 5C shows a screen display 500C generated by a device such as the computer system 102 and/or the user computing device 112. In some embodiments, the screen display 500C corresponds to one or more of the UIs 114 shown in FIG. 1 and described above with reference to FIGS. 1-5B. It should be appreciated that the UI diagram illustrated in FIG. 5C is illustrative of one contemplated embodiment, and therefore should not be construed as being limited in any way.

In FIG. 5C, a calendar and time window ("time window") 540 is displayed. In some embodiments, the time window 540 can be displayed at or near the UI controls 534, 536 in response to detecting a click, tap, or other input for interacting with the UI controls 534, 536, though this is not necessarily the case. Via the time window 540, a user or other entity can select a date and/or time, and the date and/or time selected in the time window 540 can be used to populate the text displayed in the UI controls 534, 536. The date and/or time selected in the time window 540 also can be used by the computer system 102 and/or another device to define the start time and/or stop time of the scene, thereby defining a time range as discussed above with reference to operation 402 of the method 400. Because the screen display 500C can include additional and/or alternative elements, and because the illustrated elements can be interacted with to perform additional and/or alternative functions, it should be understood that the described example is illustrative, and should not be construed as being limiting in any way.

Figure 5D:
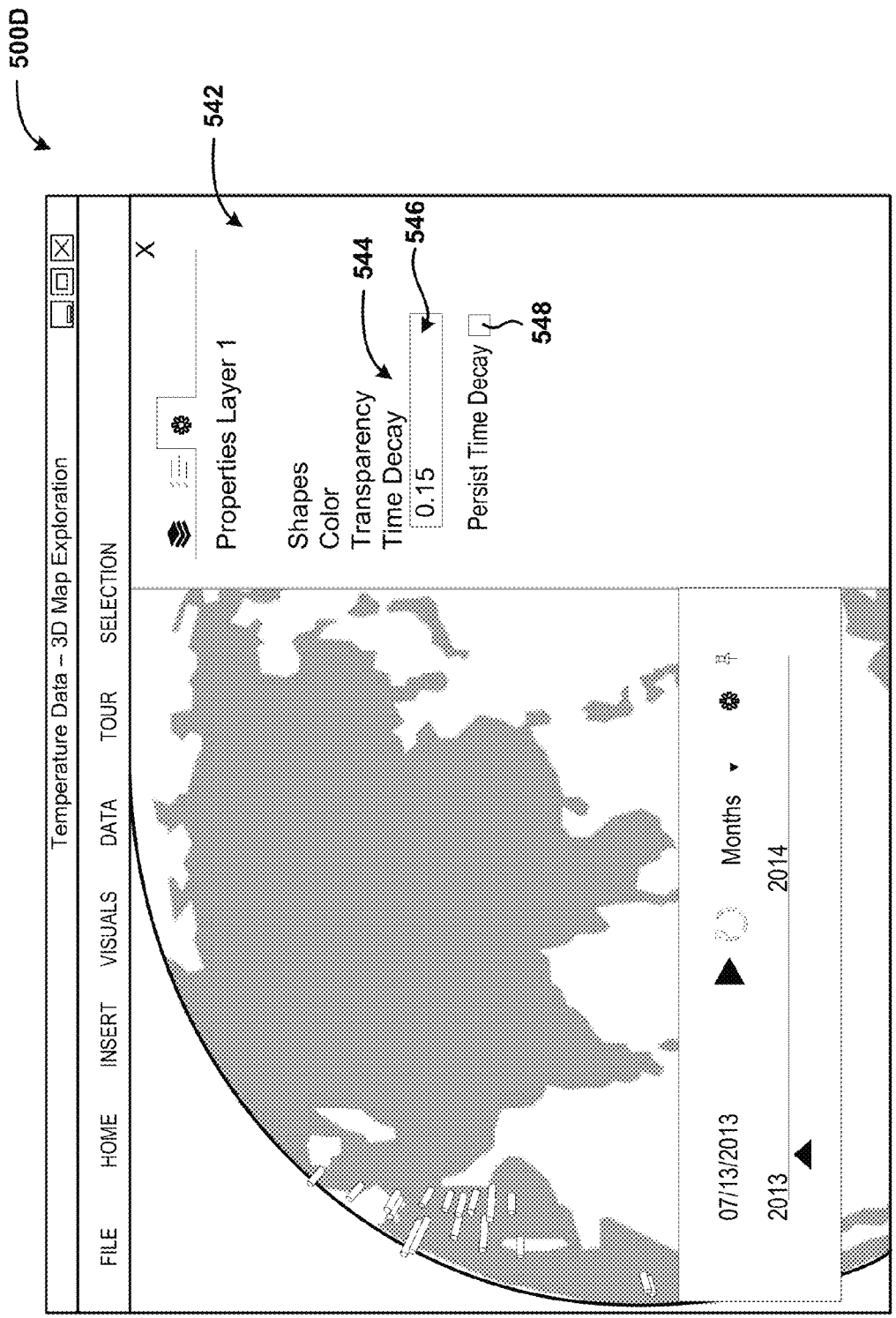

Turning now to FIG. 5D, a UI diagram showing additional aspects of the concepts and technologies disclosed herein for displaying temporal information in a spreadsheet application is described in detail. In particular, FIG. 5D shows a screen display 500D generated by a device such as the computer system 102 and/or the user computing device 112. In some embodiments, the screen display 500D corresponds to one or more of the UIs 114 shown in FIG. 1 and described above with reference to FIGS. 1-5B. It should be appreciated that the UI diagram illustrated in FIG. 5D is illustrative of one contemplated embodiment, and therefore should not be construed as being limited in any way.

In FIG. 5D, a layer properties window 542 is displayed. The layer properties window 542 can include various controls for accessing options associated with the layer. In the illustrated embodiment, the layer properties window 542 is shown as displaying an option 544 for setting time decay options. In some embodiments, the option 544 can include a link or UI control that, when selected, causes the computer system 102 and/or another device to display options for setting the time decay associated with a scene.

In the illustrated embodiment, options associated with setting the time decay are illustrated as being displayed by the computer system 102 and/or another device. As shown, a user or other entity can interact with a time decay entry field 546 to specify a time decay for the scene. It can be appreciated that the time decay entry field 546 can be populated with a value based upon a configuration setting, user input, preference, and/or in other ways. It further can be appreciated that entry of a time decay value in the time decay entry field 546 can be detected by the computer system 102 and/or another device as described above with reference to operation 404 of the method 400 and/or at other times, though this is not necessarily the case.

The layer properties window 542 also can include a UI control 548 for specifying if time decay is to persist. In some embodiments, the option to persist time decay can be selected to cause columns or data points to remain on the visualization until another value or change in the value is detected. More particularly, it can be appreciated that if time decay is deactivated, the columns may appear and/or disappear during an animated visualization if a data point shown in one frame (due to having a value >0) later has a value of 0. In some embodiments of the concepts and technologies disclosed herein, "time decay" also may be referred to as "persist the last." Thus, the persist time decay option can be selected to cause data points or columns on the visualization to remain displayed until a change to a non-zero value is detected to prevent the column or data point from disappearing from the visualization. It should be understood that this embodiment is illustrative, and should not be construed as being limiting in any way.

Figure 5E:
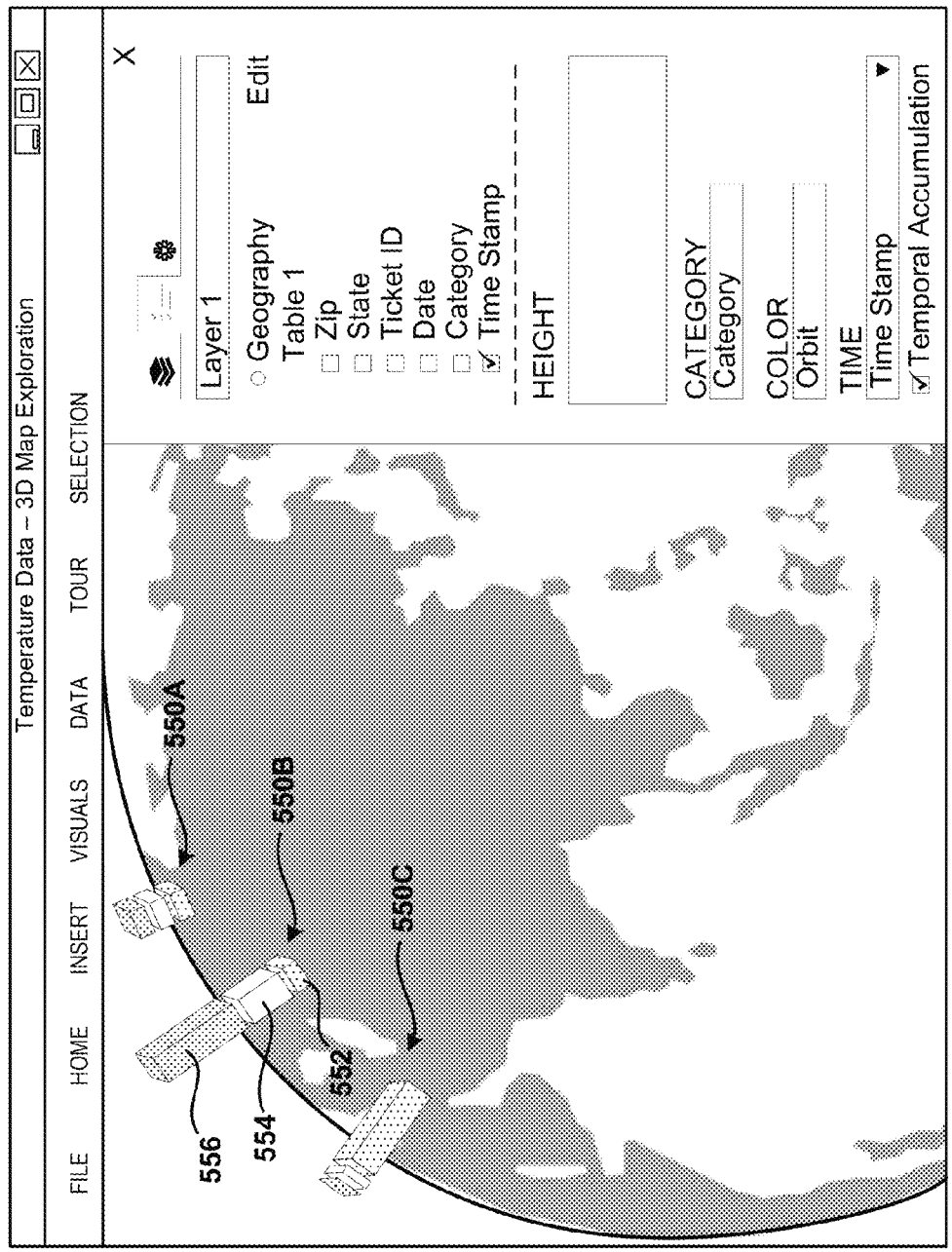

Turning now to FIG. 5E, a UI diagram showing additional aspects of the concepts and technologies disclosed herein for displaying temporal information in a spreadsheet application is described in detail. In particular, FIG. 5E shows a screen display 500E generated by a device such as the computer system 102 and/or the user computing device 112. In some embodiments, the screen display 500E corresponds to one or more of the UIs 114 shown in FIG. 1. It should be appreciated that the UI diagram illustrated in FIG. 5E is illustrative of one contemplated embodiment, and therefore should not be construed as being limited in any way.

In FIG. 5E, an example of temporal tower visualizations is illustrated. In FIG. 5E, three temporal tower visualizations 550A-C (hereinafter collectively and/or generically referred to as "temporal towers 550") are shown. The temporal towers 550 can include a stack or other representation of multiple data points and/or data values. In the illustrated example, the temporal towers 550 include a first data representation 552 that can correspond to a first data value in the data used to generate the visualization shown in the screen display 500E. Although the first data representation 552 is only labeled with respect to the temporal tower 550B, it should be understood that that each of the temporal towers 550 is illustrated as including a first data representation 552.

The first data representation 552 can correspond to a data value at a first time associated with the location at which the temporal tower 550 is represented. Because other types of representations can be used to provide the temporal towers 550, and because the temporal towers 550 can be used to display non-temporal data, it should be understood that this embodiment is illustrative, and should not be construed as being limiting in any way.

The temporal towers 550 also can include a second data representation 554. The second data representation 554 can correspond to a second data value in the data used to generate the visualization shown in the screen display 500E such as, for example, a data value at a second time associated with the location at which the temporal tower 550 is represented. Similarly, the temporal towers 550 can include a third data representation 556. The third data representation 556 can correspond to a third data value in the data used to generate the visualization shown in the screen display 500E such as, for example, a data value at a third time associated with the location at which the temporal tower 550 is represented. Because any number of data values can be shown and/or represented in the temporal towers 550, it should be understood that the example of the temporal towers 550 shown in FIG. 5E is illustrative and should not be construed as being limiting in any way.

The temporal towers 550 can be used to visualize or represent data in a stacked, clustered, or other visual relationship. In some embodiments, the temporal towers 550 may be used to show data that may or may not be aggregatable and/or to show multiple data at a particular location over time. For example, if the data corresponds to sales data, the first data representation 552 may correspond to sales in a first time period at that location, the second data representation 554 may correspond to sales in a second time period at that location, and the third data representation 556 may correspond to sales in a third time period at that location. In this example, it can be appreciated that embodiments of the concepts and technologies disclosed herein can be configured to support display of data that are not readily understood if aggregated by displaying individual points over time at the same location without overlapping the individual points. It should be understood that this embodiment is illustrative, and should not be construed as being limiting in any way.

Figure 6:
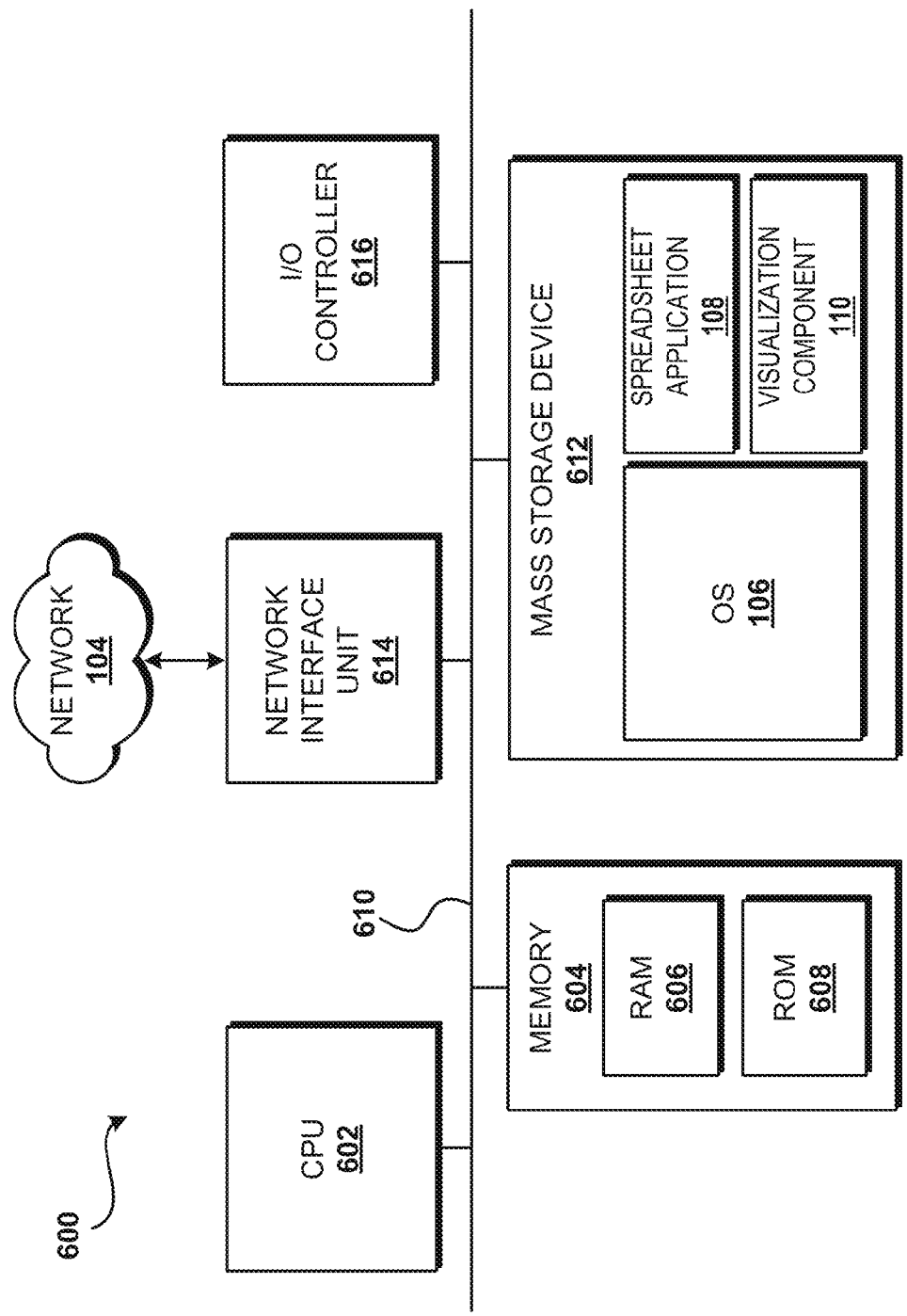
FIG. 6 is a computer architecture diagram illustrating an illustrative computer hardware and software architecture for a computing system capable of implementing aspects of the embodiments presented herein.

It should be understood that that some embodiments of the concepts and technologies disclosed herein can support synchronizing two or more data sets with separate time intervals within a single visualization or animation sequence. For example, the computer system 102 can be configured to generate a visualization for two data sets of sales, the first data set including sales data from 2000-2005 that will be displayed on one layer, and the second data set including sales data from 2005-2010 that will be displayed on a second layer. It can be appreciated that the time ranges (six years) may be the same, while the sales data may be associated with two different (though partially overlapping) time ranges. Thus, a user may wish to show both sets of data in a single visualization. In some embodiments, the computer system 102 can be configured to normalize two or more time ranges to identify a same start point, range, and/or end point and display the data sets over the same time interval. Thus, while sales data from the year 2000 may be displayed on the first layer, sales data from the year 2005 may be displayed on the second layer. It should be understood that this embodiment is illustrative, and should not be construed as being limiting in any way FIG. 6 illustrates an illustrative computer architecture 600 for a device capable of executing the software components described herein for displaying temporal information in a spreadsheet application. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 106 and one or more application programs including, but not limited to, the spreadsheet application 108, the visualization component 110, other application programs, or the like. Although not shown in FIG. 6, the mass storage device 612 also can be configured to store the spreadsheet data 118, the geographic mapping data 124, the map data 126, and/or graphical data corresponding to one or more of the UIs 114 described herein, if desired.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture 600. For purposes of the claims, the phrase "computer storage medium," and variations thereof, does not include waves or signals per se and/or communication media.

According to various embodiments, the computer architecture 600 may operate in a networked environment using logical connections to remote computers through a network such as the network 104. The computer architecture 600 may connect to the network 104 through a network interface unit 614 connected to the bus 610. It should be appreciated that the network interface unit 614 also may be utilized to connect to other types of networks and remote computer systems such as, for example, the data source 120, the geocoding services 122, the map server 128, the user computing device 112, and/or other systems or devices. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
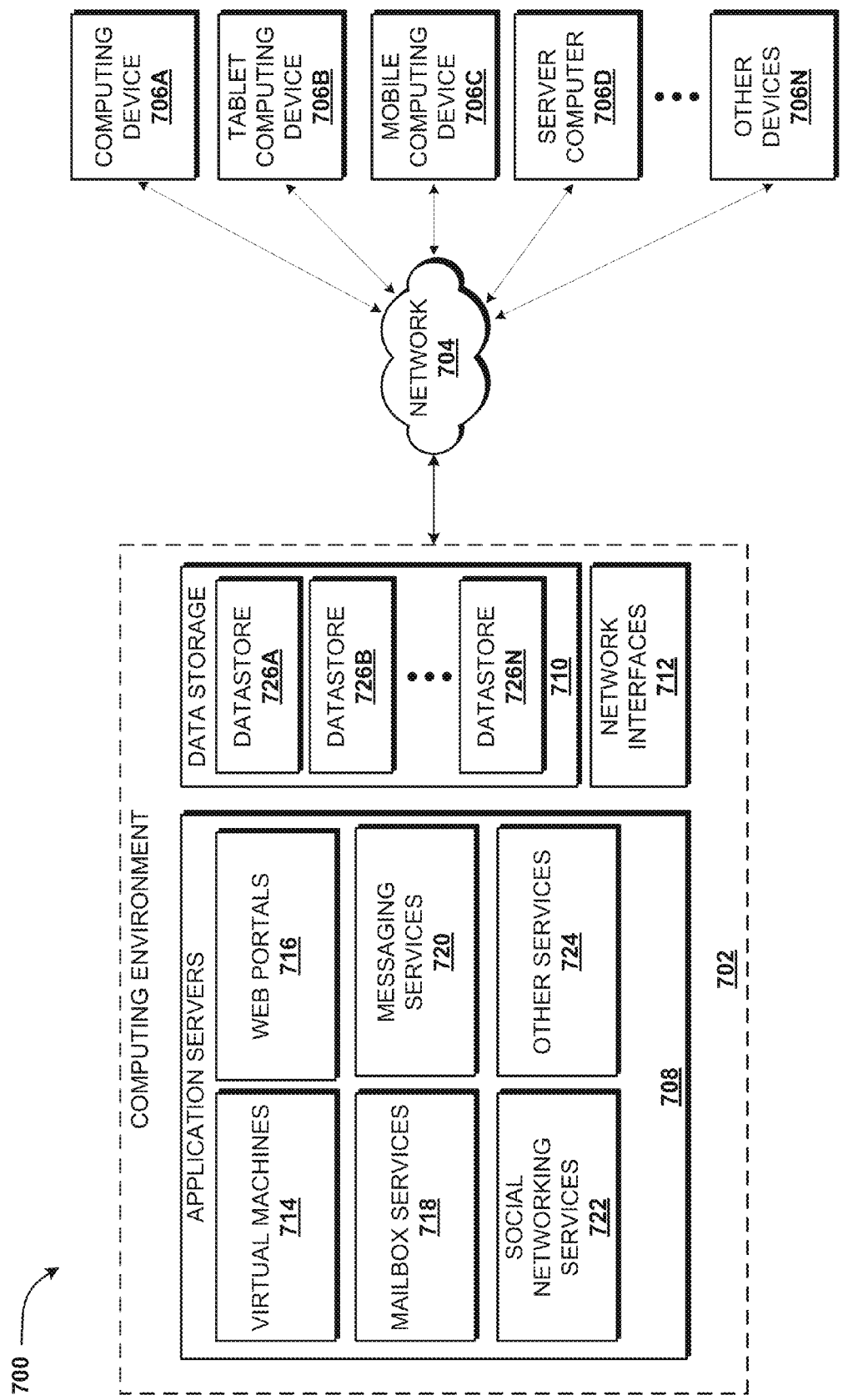
FIG. 7 is a diagram illustrating a distributed computing environment capable of implementing aspects of the embodiments presented herein.

FIG. 7 illustrates an illustrative distributed computing environment 700 capable of executing the software components described herein for displaying temporal information in a spreadsheet application. Thus, the distributed computing environment 700 illustrated in FIG. 7 can be used to provide the functionality described herein with respect to the computer system 102. The distributed computing environment 700 thus may be utilized to execute any aspects of the software components presented herein.

According to various implementations, the distributed computing environment 700 includes a computing environment 702 operating on, in communication with, or as part of the network 704. The network 704 also can include various access networks. According to various implementations, the functionality of the network 704 can be provided by the network 104 illustrated in FIG. 1. One or more client devices 706A-706N (hereinafter referred to collectively and/or generically as "clients 706") can communicate with the computing environment 702 via the network 704 and/or other connections (not illustrated in FIG. 7). In the illustrated embodiment, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated embodiment, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated embodiment, the application servers 708 host one or more virtual machines 714 for hosting applications or other functionality. According to various implementations, the virtual machines 714 host one or more applications and/or software modules for providing the functionality described herein for displaying temporal information in a spreadsheet application. It should be understood that this embodiment is illustrative, and should not be construed as being limiting in any way. The application servers 708 also host or provide access to one or more Web portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above embodiments are illustrative, and should not be construed as being limited in any way.

As shown in FIG. 7, the application servers 708 also can host other services, applications, portals, and/or other resources ("other resources") 724. The other resources 724 can include, but are not limited to, the geocoding services 122, the map server 128, the data source 120, and/or other services and/or resources. It thus can be appreciated that the computing environment 702 can provide integration of the concepts and technologies disclosed herein provided herein for displaying temporal information in a spreadsheet application with various mailbox, messaging, social networking, and/or other services or resources. For example, the concepts and technologies disclosed herein can support sharing visualizations with social network users, mail recipients, message recipients or the like. Similarly, users or other entities can share visualizations and/or spreadsheet data 118 with social networking users, friends, connections, mail recipients, systems or devices, combinations thereof, or the like.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store the operating system 106, the spreadsheet application 108, the visualization component 110, graphics data corresponding to one or more UIs 114, the spreadsheet data 118, the geographic mapping data 124, the map data 126, combinations thereof, or the like.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 700 to utilize the functionality described herein for displaying temporal information in a spreadsheet application.

Figure 8:
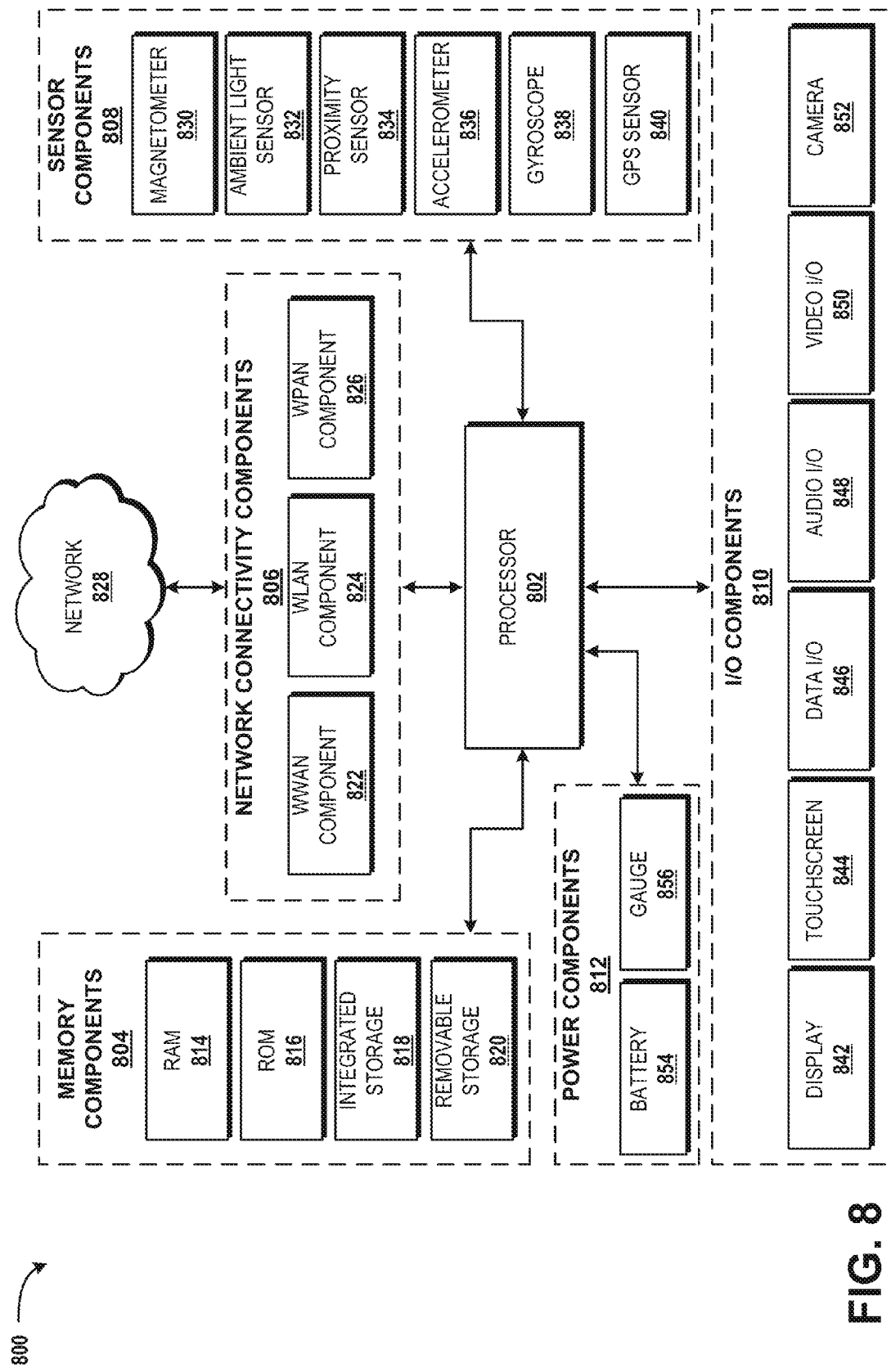
FIG. 8 is a computer architecture diagram illustrating a computing device architecture capable of implementing aspects of the embodiments presented herein.

Turning now to FIG. 8, an illustrative computing device architecture 800 for a computing device that is capable of executing various software components described herein for displaying temporal information in a spreadsheet application. The computing device architecture 800 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 800 is applicable to any of the clients 806 shown in FIG. 7. Furthermore, aspects of the computing device architecture 800 may be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated embodiment, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some embodiments, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some embodiments, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720p, 1080p, and greater), video games, three-dimensional modeling applications, and the like. In some embodiments, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some embodiments, the processor 802 is fabricated, in part, utilizing a package-on-package ("PoP") integrated circuit packaging technique. Moreover, the processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some embodiments, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some embodiments, the RAM 814 or a portion thereof, the ROM 816 or a portion thereof, and/or some combination the RAM 814 and the ROM 816 is integrated in the processor 802. In some embodiments, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some embodiments, the removable storage 820 is provided in lieu of the integrated storage 818. In other embodiments, the removable storage 820 is provided as additional optional storage. In some embodiments, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which may be a WWAN, a WLAN, or a WPAN. Although a single network 828 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

In some embodiments, the network 828 can correspond to the network 104 and/or the network 704 illustrated and described in FIGS. 1 and 6-7. In some other embodiments, the network 828 can include the network 104 illustrated and described with reference to FIGS. 1 and 6 and/or the network 704 illustrated and described in FIG. 7. In yet other embodiments, the network 828 can provide access to the network 104 illustrated and described with reference to FIGS. 1 and 6 and/or the network 704 illustrated and described in FIG. 7.

The network 828 may be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("Wi-MAX"). Moreover, the network 828 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 may be configured to provide voice and/or data communications with any combination of the above technologies. The network 828 may be configured to or adapted to provide voice and/or data communications in accordance with future generation technologies.

In some embodiments, the WWAN component 822 is configured to provide dual-multi-mode connectivity to the network 828. For example, the WWAN component 822 may be configured to provide connectivity to the network 828, wherein the network 828 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 828 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 824 is configured to connect to the network 828 via the WI-FI access points. Such connections may be secured via various encryption technologies including, but not limited, WI-FI Protected Access ("WPA"), WPA2, Wired Equivalent Privacy ("WEP"), and the like.

The network 828 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, also may be incorporated in the computing device architecture 800.

The magnetometer 830 is configured to measure the strength and direction of a magnetic field. In some embodiments the magnetometer 830 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 830 are contemplated.

The ambient light sensor 832 is configured to measure ambient light. In some embodiments, the ambient light sensor 832 provides measurements to an application program stored within one the memory components 804 in order to automatically adjust the brightness of a display (described below) to compensate for low-light and high-light environments. Other uses of measurements obtained by the ambient light sensor 832 are contemplated.

The proximity sensor 834 is configured to detect the presence of an object or thing in proximity to the computing device without direct contact. In some embodiments, the proximity sensor 834 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some embodiments, output from the accelerometer 836 is used by an application program as an input mechanism to control some functionality of the application program. For example, the application program may be a video game in which a character, a portion thereof, or an object is moved or otherwise manipulated in response to input received via the accelerometer 836. In some embodiments, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some embodiments, output from the gyroscope 838 is used by an application program as an input mechanism to control some functionality of the application program. For example, the gyroscope 838 can be used for accurate recognition of movement within a three-dimensional environment of a video game application or some other application. In some embodiments, an application program utilizes output from the gyroscope 838 and the accelerometer 836 to enhance control of some functionality of the application program. Other uses of the gyroscope 838 are contemplated.

The GPS sensor 840 is configured to receive signals from GPS satellites for use in calculating a location. The location calculated by the GPS sensor 840 may be used by any application program that requires or benefits from location information. For example, the location calculated by the GPS sensor 840 may be used with a navigation application program to provide directions from the location to a destination or directions from the destination to the location. Moreover, the GPS sensor 840 may be used to provide location information to an external location-based service, such as E911 service. The GPS sensor 840 may obtain location information generated via WI-FI, WIMAX, and/or cellular triangulation techniques utilizing one or more of the network connectivity components 806 to aid the GPS sensor 840 in obtaining a location fix. The GPS sensor 840 may also be used in Assisted GPS ("A-GPS") systems.

The I/O components 810 include a display 842, a touchscreen 844, a data I/O interface component ("data I/o") 846, an audio I/O interface component ("audio I/O") 848, a video I/O interface component ("video I/O") 850, and a camera 852. In some embodiments, the display 842 and the touchscreen 844 are combined. In some embodiments two or more of the data I/O component 846, the audio I/O component 848, and the video I/O component 850 are combined. The I/O components 810 may include discrete processors configured to support the various interface described below, or may include processing functionality built-in to the processor 802.

The display 842 is an output device configured to present information in a visual form. In particular, the display 842 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 842 is a liquid crystal display ("LCD") utilizing any active or passive matrix technology and any backlighting technology (if used). In some embodiments, the display 842 is an organic light emitting diode ("OLED") display. Other display types are contemplated.

The touchscreen 844 is an input device configured to detect the presence and location of a touch. The touchscreen 844 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 844 is incorporated on top of the display 842 as a transparent layer to enable a user to use one or more touches to interact with objects or other information presented on the display 842. In other embodiments, the touchscreen 844 is a touch pad incorporated on a surface of the computing device that does not include the display 842. For example, the computing device may have a touchscreen incorporated on top of the display 842 and a touch pad on a surface opposite the display 842.

In some embodiments, the touchscreen 844 is a single-touch touchscreen. In other embodiments, the touchscreen 844 is a multi-touch touchscreen. In some embodiments, the touchscreen 844 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 844. As such, a developer may create gestures that are specific to a particular application program.

In some embodiments, the touchscreen 844 supports a tap gesture in which a user taps the touchscreen 844 once on an item presented on the display 842. The tap gesture may be used for various reasons including, but not limited to, opening or launching whatever the user taps. In some embodiments, the touchscreen 844 supports a double tap gesture in which a user taps the touchscreen 844 twice on an item presented on the display 842. The double tap gesture may be used for various reasons including, but not limited to, zooming in or zooming out in stages. In some embodiments, the touchscreen 844 supports a tap and hold gesture in which a user taps the touchscreen 844 and maintains contact for at least a pre-defined time. The tap and hold gesture may be used for various reasons including, but not limited to, opening a context-specific menu.

In some embodiments, the touchscreen 844 supports a pan gesture in which a user places a finger on the touchscreen 844 and maintains contact with the touchscreen 844 while moving the finger on the touchscreen 844. The pan gesture may be used for various reasons including, but not limited to, moving through screens, images, or menus at a controlled rate. Multiple finger pan gestures are also contemplated. In some embodiments, the touchscreen 844 supports a flick gesture in which a user swipes a finger in the direction the user wants the screen to move. The flick gesture may be used for various reasons including, but not limited to, scrolling horizontally or vertically through menus or pages. In some embodiments, the touchscreen 844 supports a pinch and stretch gesture in which a user makes a pinching motion with two fingers (e.g., thumb and forefinger) on the touchscreen 844 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 844. As such, the above gestures should be understood as being illustrative and should not be construed as being limiting in any way.

The data I/O interface component 846 is configured to facilitate input of data to the computing device and output of data from the computing device. In some embodiments, the data I/O interface component 846 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 848 is configured to provide audio input and/or output capabilities to the computing device. In some embodiments, the audio I/O interface component 846 includes a microphone configured to collect audio signals. In some embodiments, the audio I/O interface component 846 includes a headphone jack configured to provide connectivity for headphones or other external speakers. In some embodiments, the audio interface component 848 includes a speaker for the output of audio signals. In some embodiments, the audio I/O interface component 846 includes an optical audio cable out.

The video I/O interface component 850 is configured to provide video input and/or output capabilities to the computing device. In some embodiments, the video I/O interface component 850 includes a video connector configured to receive video as input from another device (e.g., a video media player such as a DVD or BLURAY player) or send video as output to another device (e.g., a monitor, a television, or some other external display). In some embodiments, the video I/O interface component 850 includes a High-Definition Multimedia Interface ("HDMI"), mini-HDMI, micro-HDMI, DisplayPort, or proprietary connector to input/output video content. In some embodiments, the video I/O interface component 850 or portions thereof is combined with the audio I/O interface component 848 or portions thereof.

The camera 852 can be configured to capture still images and/or video. The camera 852 may utilize a charge coupled device ("CCD") or a complementary metal oxide semiconductor ("CMOS") image sensor to capture images. In some embodiments, the camera 852 includes a flash to aid in taking pictures in low-light environments. Settings for the camera 852 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 854, which can be connected to a battery gauge 856. The batteries 854 may be rechargeable or disposable. Rechargeable battery types include, but are not limited to, lithium polymer, lithium ion, nickel cadmium, and nickel metal hydride. Each of the batteries 854 may be made of one or more cells.

The battery gauge 856 can be configured to measure battery parameters such as current, voltage, and temperature. In some embodiments, the battery gauge 856 is configured to measure the effect of a battery's discharge rate, temperature, age and other factors to predict remaining life within a certain percentage of error. In some embodiments, the battery gauge 856 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component 844.

Based on the foregoing, it should be appreciated that technologies for displaying temporal information in a spreadsheet application have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for displaying temporal information in a spreadsheet application, the computer-implemented method comprising performing computer-implemented operations for:
    obtaining, at a computer system executing a visualization component, spreadsheet data including data values, the temporal information, and geographic location information;
    generating, by the computer system, a visualization of the spreadsheet data based, at least partially, upon the data values, the geographic location information, and the temporal information by
        determining if the visualization is to include a time decay in which a data point of the spreadsheet data is persisted beyond a time associated with the data point, and
        in response to a determination that the visualization is to include the time decay, determining a duration of the time decay and generating animation frames of the visualization with the time decay;
    determining, by the computer system, a time range for the visualization, the time range comprising a duration of time between a start time and an end time;
    determining, based upon the time range, an animation speed for the visualization; and
    outputting, by the computer system, the visualization.

2. The method of claim 1, wherein the animation speed is bound to the time range, and wherein generating the visualization based upon the temporal information comprises generating animation frames of the visualization based, at least partially, upon the time range and the animation speed.

3. The method of claim 1, wherein generating the visualization based upon the temporal information comprises:
    determining if the visualization is to include time accumulation whereby a plurality of data values are visually accumulated; and
    in response to a determination that the visualization is to include time accumulation, generating animation frames of the visualization using time accumulation.

4. The method of claim 3, wherein generating the animation frames comprises:
    rendering a visualization of data points associated with a location in each of the animation frames;

determining a cumulative value associated with the data points at each of the animation frames; and rendering a visualization of the cumulative value in each of the animation frames.

5. The method of claim 1, further comprising:

obtaining geographic mapping data from a geocoding service, the geographic mapping data comprising data mapping the geographic location information to geocoded information; and obtaining, from a map server, map data corresponding to the geocoded information.

6. The method of claim 5, wherein generating the visualization comprises generating the visualization based, at least partially, upon the geographic mapping data and the map data.

7. The method of claim 1, further comprising:

determining if time accumulation is to be shown in the visualization, whereby a plurality of data values are visually accumulated, and wherein generating the visualization comprises generating the visualization based, at least partially, upon the time range, the animation speed, and a determination regarding the time accumulation.

8. The method of claim 7, wherein determining the time range, the animation speed, and the determination comprises obtaining data from a user computing device, the data comprising input obtained via at least one user interface presented at the user computing device.

9. The method of claim 8, wherein the user interface comprises a time control window, a link to a layer properties window, and a further link to a time properties window.

10. A computer storage medium having computer readable instructions stored thereon that, when executed by a computer, cause the computer to:

obtain spreadsheet data including data values, temporal information, and geographic location information;

determining, by the computer system, a time range for the visualization, the time range comprising a duration of time between a start time and an end time associated with the temporal information included in the spreadsheet data;

determining, based upon the time range, an animation speed for the visualization, wherein the animation speed is determined, at least partially, based upon the time range;

generate a visualization of the spreadsheet data based, at least partially, upon the data values, the time range, the animation speed, the geographic location information and the temporal information by determining if the visualization is to include a time decay in which a data point of the spreadsheet data is persisted beyond a time associated with the data point, and in response to a determination that the visualization is to include the time decay, determining a duration of the time decay and generating animation frames of the visualization with the time decay; and output the visualization, the visualization comprising the animation frames.

11. The computer storage medium of claim 10, wherein generating the visualization based upon the temporal information comprises:

determining if the visualization is to include time accumulation whereby a plurality of data values are visually accumulated; and in response to a determination that the visualization is to include time accumulation, generating the animation frames using time accumulation.

12. The computer storage medium of claim 11, wherein generating the animation frames using time accumulation comprises:

rendering a visualization of the data values at the data points in each of the animation frames;

determining a cumulative value associated with the data values of the data points at each of the animation frames; and rendering a visualization of the cumulative value in each of the animation frames.

13. The computer storage medium of claim 10, further comprising computer readable instructions that, when executed by the computer, cause the computer to generate a user interface comprising a temporal tower visualization of the data in a stacked relationship that represents multiple types of data included in the spreadsheet data.

14. The computer storage medium of claim 10, further comprising computer readable instructions that, when executed by the computer, cause the computer to:

determine if time accumulation is to be shown in the visualization, whereby a plurality of data values are visually accumulated, and wherein generating the visualization comprises generating the visualization based, at least partially, upon the time range, the animation speed, and a determination regarding the time accumulation.

15. The computer storage medium of claim 14, wherein determining the time range, the animation speed, and the determination comprises obtaining data from a user computing device, the data comprising input obtained via at least one user interface presented at the user computing device.

16. A computer storage medium having computer readable instructions stored thereon that, when executed by a computer, cause the computer to:

obtain spreadsheet data including data values, temporal information, and geographic location information;

determine a time range for a visualization of the spreadsheet data based upon the spreadsheet data, the time range being defined as a duration of time between a start time and end time associated with the spreadsheet data, the visualization comprising animation frames;

determine, based upon the time range, an animation speed for the visualization, the animation speed being at least partially bound to the time range, wherein changing the time range results in a change to the animation speed;

generate the visualization based, at least partially, upon the data values, the time range, the animation speed, the geographic location information, and the temporal information by determining if the visualization is to include a time decay in which a data point of the spreadsheet data is persisted beyond a time associated with the data point, and in response to a determination that the visualization is to include the time decay, determining a duration of the time decay and generating animation frames of the visualization with the time decay; and output the visualization to a user computing device in communication with the computer.

17. The computer storage medium of claim 16, wherein generating the visualization based upon the temporal information comprises:

determining if the visualization is to include time accumulation whereby a plurality of data values are visually accumulated; and in response to a determination that the visualization is to include time accumulation, generating the animation frames using time accumulation, wherein generating the animation frames using time accumulation comprises rendering a visualization of the data values at the data points in each of the animation frames, determining a cumulative value associated with the data values of the data points at each of the animation frames, and rendering a visualization of the cumulative value in each of the animation frames.

18. The computer storage medium of claim 16, wherein determining the time range, the animation speed, and the determination comprises obtaining data from the user computing device, the data comprising input obtained via at least one user interface presented at the user computing device.

19. The computer storage medium of claim 16, wherein determining the time range, the animation speed, and the determination comprises obtaining data from the user computing device, the data comprising input obtained via at least one user interface presented at the user computing device, the user interface comprising:

a time control window having a time scrubber for displaying the animation frames;

a link to a layer properties window comprising an option to enable time accumulation whereby a plurality of data values are visually accumulated; and a further link to a time properties window comprising a control for specifying the animation speed and a further control for specifying the time range.

* * * * *